United States Patent
Gopalan et al.

(10) Patent No.: US 10,125,509 B2
(45) Date of Patent: Nov. 13, 2018

(54) POOL CLEANER WITH HYDRAULIC TIMER ASSEMBLY

(71) Applicant: Pentair Water Pool and Spa, Inc., Sanford, NC (US)

(72) Inventors: Suresh Gopalan, Milpitas, CA (US); Nitin Agarwal, Haryana (IN); Jayamurali Kaladharan, Tamil Nadu (IN); Brian King, Apex, NC (US); Leonard Richiuso, Sunnyvale, CA (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 642 days.

(21) Appl. No.: 14/634,089

(22) Filed: Feb. 27, 2015

(65) Prior Publication Data

US 2015/0167338 A1 Jun. 18, 2015

Related U.S. Application Data

(62) Division of application No. 13/252,103, filed on Oct. 3, 2011, now Pat. No. 8,990,990.

(51) Int. Cl.
*E04H 4/16* (2006.01)
*A47L 9/14* (2006.01)
*B60K 3/04* (2006.01)

(52) U.S. Cl.
CPC .......... *E04H 4/1654* (2013.01); *A47L 9/1427* (2013.01); *B60K 3/04* (2013.01)

(58) Field of Classification Search
CPC ... E04H 4/1654; E04H 4/1663; E04H 4/1636; E04H 4/1609; E04H 4/1618; A47L 9/1427; B60K 3/04
See application file for complete search history.

(56) References Cited

U.S. PATENT DOCUMENTS 1,902,728 A 3/1933 Schmidt
2,141,811 A 12/1938 Everson
(Continued)

FOREIGN PATENT DOCUMENTS

AU 732645 B2 1/1999
AU 2002301986 B2 3/2003
(Continued)

OTHER PUBLICATIONS

Zodiac Pool Systems, Inc.; "Robotic Pool Cleaner Review.com"; pp. 1-2; 2010; Vista, CA 92081-8438.
(Continued)

*Primary Examiner* — Robert Scruggs
(74) *Attorney, Agent, or Firm* — Quarles & Brady LLP

(57) ABSTRACT

According to some embodiments, a pool cleaner includes a chassis, a housing supported by the chassis, at least one drive wheel supported by the chassis, and a turbine assembly that rotates in one of a first direction and a second direction to drive the at least one drive wheel. The pool cleaner also includes a timer disc assembly with at least one rotating timer disc. The timer disc assembly controls a flow of pressurized fluid away from the housing in a forward direction for backward propulsion assistance of the pool cleaner during a first time period, a rearward direction for forward propulsion assistance of the pool cleaner during a second time period, and a sideways direction for turning propulsion assistance of the pool cleaner during at least a portion of one of the first time period and the second time period. The timer disc assembly also controls a flow of pressurized fluid to the turbine assembly through a first opening for driving the turbine assembly in the first direction during the first time period and a second opening for driving the turbine assembly in the second direction during the second time period.

20 Claims, 22 Drawing Sheets

(56) References Cited

U.S. PATENT DOCUMENTS

| | | |
|---|---|---|
| 2,191,424 A | 2/1940 | Cardinal |
| 2,646,889 A | 7/1953 | Dulak |
| 2,832,561 A | 4/1958 | Holl |
| 2,988,762 A | 6/1961 | Babcock |
| 3,301,606 A | 1/1967 | Bruno |
| 3,321,787 A | 5/1967 | Myers |
| 3,324,492 A | 6/1967 | Myers |
| 3,405,733 A | 10/1968 | Hansen |
| 3,444,575 A | 5/1969 | Martin |
| RE26,741 E | 12/1969 | Myers |
| 3,556,151 A | 1/1971 | Masuda |
| 3,790,979 A | 2/1974 | Foster |
| 3,857,651 A | 12/1974 | Bruno |
| 3,936,899 A | 2/1976 | Henkin et al. |
| 3,950,809 A | 4/1976 | Schatzmann |
| 3,959,838 A | 6/1976 | Hannah |
| 3,961,393 A | 6/1976 | Pansini |
| 4,007,749 A | 2/1977 | Pansini |
| 4,077,424 A | 3/1978 | Ehret et al. |
| 4,086,933 A | 5/1978 | Pansini |
| 4,313,455 A | 2/1982 | Pitman |
| 4,356,582 A | 11/1982 | Stephenson |
| 4,402,101 A | 9/1983 | van Zyl |
| 4,429,429 A | 2/1984 | Altschul |
| 4,458,708 A | 7/1984 | Leonard et al. |
| 4,501,297 A | 2/1985 | Baker |
| 4,522,221 A | 6/1985 | Chivens et al. |
| 4,558,479 A | 12/1985 | Greskovics et al. |
| 4,589,986 A | 5/1986 | Greskovics et al. |
| 4,766,931 A | 8/1988 | Chauvier et al. |
| 4,768,532 A | 9/1988 | Johnson |
| 4,817,656 A | 4/1989 | Gould |
| 4,900,432 A | 2/1990 | Arnold et al. |
| 4,950,393 A | 8/1990 | Goettl |
| 5,001,800 A | 3/1991 | Parenti et al. |
| 5,014,912 A | 5/1991 | Brooks |
| 5,044,034 A | 9/1991 | Iannucci |
| 5,048,149 A | 9/1991 | Heinen, Jr. |
| 5,082,022 A | 1/1992 | Boundy |
| 5,093,950 A | 3/1992 | Heier |
| 5,259,082 A | 11/1993 | Sebor |
| 5,259,258 A | 11/1993 | Sebor |
| 5,261,287 A | 11/1993 | Sebor |
| 5,274,868 A | 1/1994 | Sebor |
| 5,285,547 A | 2/1994 | Sebor |
| 5,303,444 A | 4/1994 | Sebor |
| 5,371,910 A | 12/1994 | Sebor |
| 5,386,607 A | 2/1995 | Sebor |
| 5,404,607 A | 4/1995 | Sebor |
| 5,507,058 A | 4/1996 | Minami et al. |
| D373,230 S | 8/1996 | Sebor et al. |
| 5,603,135 A | 2/1997 | Jones et al. |
| 5,664,275 A | 9/1997 | Sebor |
| 5,740,576 A | 4/1998 | Sebor et al. |
| 5,797,156 A | 8/1998 | Sebor |
| D401,023 S | 11/1998 | Sebor et al. |
| 5,863,425 A | 1/1999 | Herlehy et al. |
| 5,893,188 A | 4/1999 | Campbell et al. |
| 5,896,610 A | 4/1999 | Sebor et al. |
| D409,341 S | 5/1999 | Van Etten et al. |
| 5,933,899 A | 8/1999 | Campbell et al. |
| 5,974,647 A | 11/1999 | Sebor |
| 5,985,156 A * | 11/1999 | Henkin ............... E04H 4/1654 134/167 R |
| 6,003,184 A | 12/1999 | Campbell et al. |
| D418,640 S | 1/2000 | Veloskey et al. |
| 6,039,886 A | 3/2000 | Henkin et al. |
| 6,061,860 A | 5/2000 | Fitzgerald |
| 6,094,764 A | 8/2000 | Veloskey et al. |
| 6,115,864 A | 9/2000 | Davidsson et al. |
| 6,119,293 A | 9/2000 | Phillipson et al. |
| 6,158,464 A | 12/2000 | Campbell et al. |
| 6,189,556 B1 | 2/2001 | Blake et al. |
| 6,212,725 B1 | 4/2001 | Porat |
| 6,237,175 B1 | 5/2001 | Phillipson et al. |
| 6,280,611 B1 | 8/2001 | Henkin et al. |
| 6,311,353 B1 | 11/2001 | Phillipson et al. |
| 6,311,728 B1 | 11/2001 | Goettl et al. |
| 6,325,087 B1 | 12/2001 | Tarr |
| 6,365,039 B1 | 4/2002 | Henkin et al. |
| 6,387,250 B1 | 5/2002 | Henkin et al. |
| 6,398,878 B1 | 6/2002 | Henkin et al. |
| D468,067 S | 12/2002 | Stoltz et al. |
| D469,589 S | 1/2003 | Wichmann et al. |
| 6,502,269 B1 | 1/2003 | Balchan et al. |
| 6,539,967 B2 | 4/2003 | Tarr |
| 6,560,808 B2 | 5/2003 | Phillipson et al. |
| 6,564,417 B2 | 5/2003 | Porat |
| 6,601,255 B1 | 8/2003 | van der Meyden et al. |
| D481,181 S | 10/2003 | Lath et al. |
| 6,665,900 B2 | 12/2003 | Wichmann et al. |
| RE38,479 E | 3/2004 | Henkin et al. |
| 6,740,233 B2 | 5/2004 | Stoltz et al. |
| 6,908,550 B2 | 6/2005 | Silverstein |
| 6,932,112 B2 | 8/2005 | Bradford, III et al. |
| 6,971,136 B2 | 12/2005 | Horvath et al. |
| 6,984,315 B2 | 1/2006 | Dolton, III |
| 7,039,980 B2 | 5/2006 | VanDer Meyden et al. |
| D526,101 S | 8/2006 | Blanc-Tailleur |
| D529,669 S | 10/2006 | Blanc-Tailleur |
| 7,168,120 B2 | 1/2007 | Habif et al. |
| 7,213,287 B2 | 5/2007 | Hui |
| 7,316,751 B2 | 1/2008 | Horvath et al. |
| 7,318,448 B2 | 1/2008 | Fleischer et al. |
| 7,373,948 B2 | 5/2008 | Campbell et al. |
| D581,611 S | 11/2008 | van der Meijden et al. |
| D582,112 S | 12/2008 | van der Meijden et al. |
| D584,209 S | 1/2009 | Klimas |
| D594,610 S | 6/2009 | Klimas |
| D598,168 S | 8/2009 | Sumonthee |
| D599,967 S | 9/2009 | Blanc-Tailleur |
| 7,677,268 B2 | 3/2010 | Griffin et al. |
| 7,690,066 B2 | 4/2010 | Stoltz et al. |
| 7,726,342 B2 | 6/2010 | Campbell et al. |
| 7,805,792 B2 | 10/2010 | Roumagnac |
| 7,827,643 B2 | 11/2010 | Erlich et al. |
| 7,849,547 B2 | 12/2010 | Erlich et al. |
| 7,900,308 B2 | 3/2011 | Erlich et al. |
| 2002/0124012 A1 | 9/2002 | Reed |
| 2005/0108836 A1 | 5/2005 | Rowen et al. |
| 2005/0262652 A1 | 12/2005 | Sumonthee |
| 2007/0294846 A1 | 12/2007 | Lapping |
| 2008/0060984 A1 * | 3/2008 | Henkin ............... E04H 4/1654 210/143 |
| 2008/0087299 A1 | 4/2008 | Erlich et al. |
| 2008/0125943 A1 | 5/2008 | Finezilber |
| 2008/0189885 A1 | 8/2008 | Erlich et al. |
| 2008/0235887 A1 | 10/2008 | Horvath et al. |
| 2008/0236628 A1 | 10/2008 | Horvath et al. |
| 2008/0244843 A1 | 10/2008 | Hui et al. |
| 2009/0089944 A1 | 4/2009 | Griffin et al. |
| 2009/0211641 A1 | 8/2009 | Tipotsch |
| 2010/0005613 A1 | 1/2010 | Morgan et al. |
| 2010/0065482 A1 | 3/2010 | Sumonthee |
| 2010/0299852 A1 | 12/2010 | Fayyad |
| 2010/0299863 A1 | 12/2010 | Dewing |
| 2011/0000030 A1 | 1/2011 | Pichon et al. |

FOREIGN PATENT DOCUMENTS

| | | |
|---|---|---|
| EP | 1978184 A2 | 10/2008 |
| MX | 2009000336 | 7/2010 |

OTHER PUBLICATIONS

Waterco; Nitro Robotic Wall Scrubber Cleaner; pp. 1-2; Rydalmere, Australia; publication date unknown.

* cited by examiner

POOL CLEANER WITH HYDRAULIC TIMER ASSEMBLY

CROSS REFERENCE TO RELATED APPLICATIONS

This application claims the benefit of U.S. patent application Ser. No. 13/252,103 filed on Oct. 3, 2011, the entire contents of which are incorporated herein by reference.

BACKGROUND

Automatic swimming pool cleaners include components for driving the pool cleaners along the floor and sidewalls of a swimming pool, either in a random or deliberate manner. For example, conventional pressure side cleaners and suction cleaners often use hydraulic turbine assemblies as drive systems to drive one or more wheels. Robotic cleaners often include a motor or other mechanical system powered by an external power source to drive one or more wheels.

With respect to pressure side cleaners and suction cleaners, vacuum systems of the cleaners (e.g., to vacuum debris from the floor and sidewalls and deposit the debris into a debris bag or debris canister) are often integrated with the drive systems. As a result, changes occurring in the drive system, such as turning or reversing motion, can affect the vacuum system. In some conventional pool cleaners, vacuum systems are only capable of vacuuming debris during forward motion of the drive system.

With respect to robotic cleaners, scrubber assemblies are often used as wheels for driving the cleaners. The scrubber assemblies also provide assistance to the vacuum systems by agitating debris along the surfaces traveled by the cleaner to facilitate debris pick-up. These types of pool cleaners cannot operate without the scrubber assemblies present because they are an essential part of the driving systems.

SUMMARY

According to some embodiments, a pool cleaner includes a chassis, a housing supported by the chassis, at least one drive wheel supported by the chassis, and a turbine assembly which rotates in one of a first direction and a second direction to drive the at least one drive wheel. The pool cleaner also includes a timer disc assembly with at least one rotating timer disc. The timer disc assembly controls a flow of pressurized fluid away from the housing in a forward direction for backward propulsion assistance of the pool cleaner during a first time period, a rearward direction for forward propulsion assistance of the pool cleaner during a second time period, and a sideways direction for turning propulsion assistance of the pool cleaner during at least a portion of one of the first time period and the second time period. The timer disc assembly also controls a flow of pressurized fluid to the turbine assembly through a first opening for driving the turbine assembly in the first direction during the first time period and a second opening for driving the turbine assembly in the second direction during the second time period.

According to further embodiments, a pool cleaner comprises a housing including at least two wheels and a distributor manifold disposed on the housing. A timer disc assembly is in communication with the distributor manifold. The timer disc assembly includes an outer housing, a plurality of outlet ports extending through the outer housing, a rotating timer disc positioned within the outer housing adjacent to the plurality of outlet ports, and at least one port seal liner positioned between one of the plurality of outlet ports and the rotating timer disc, the at least one port seal liner including an elastomeric piece and a liner piece, the liner piece being in contact with the rotating timer disc.

Some embodiments of a pool cleaner include a chassis, a housing, and at least one drive wheel supported by the chassis. A turbine assembly is in communication with the at least one drive wheel. A timer disc assembly includes at least one rotating timer disc that controls a flow of pressurized fluid to the turbine assembly through a first outlet port for driving the turbine assembly in a first direction during a first time period, and a second outlet port for driving the turbine assembly in a second direction during a second time period.

DETAILED DESCRIPTION

Figure 1:
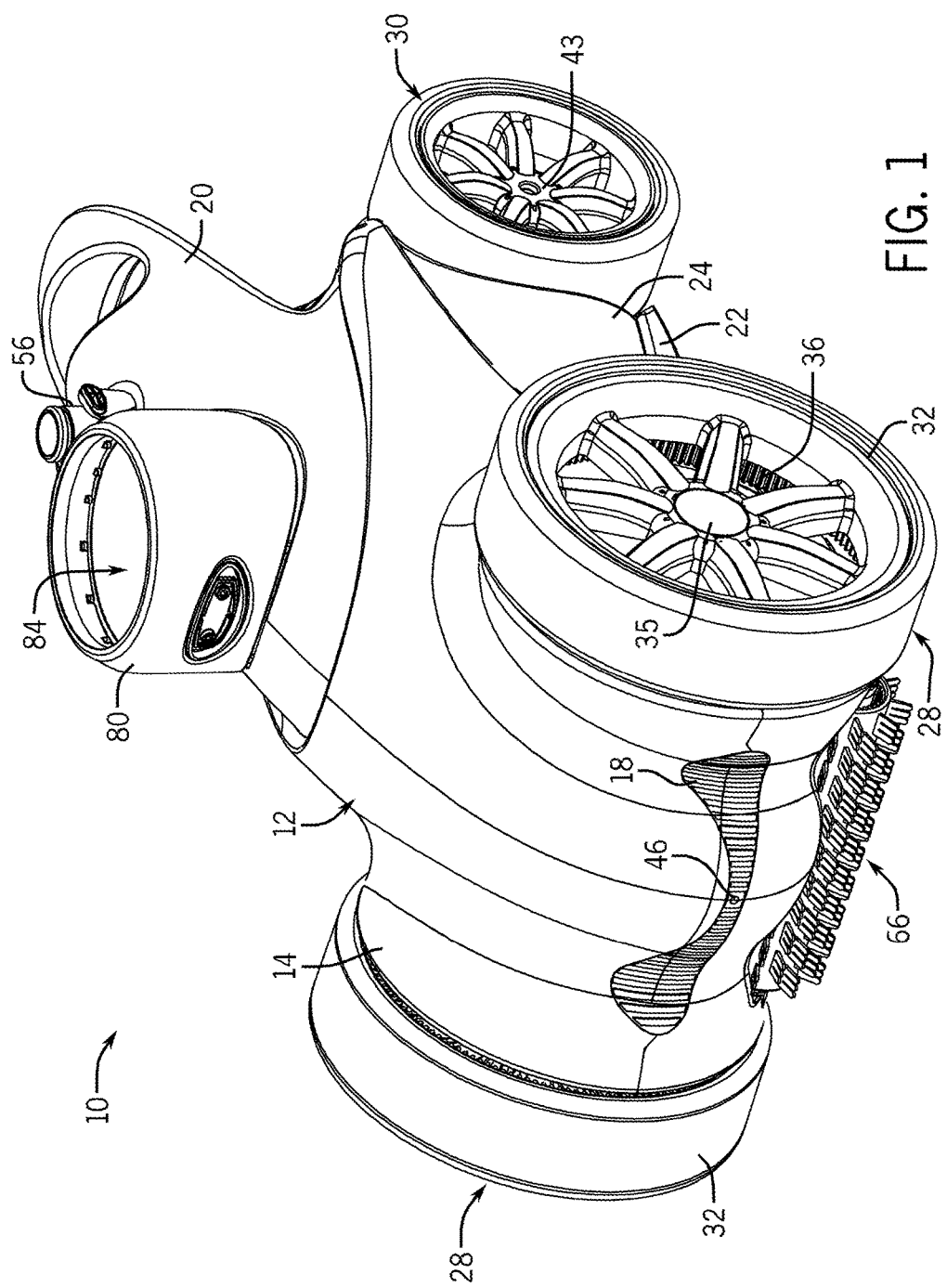
FIG. 1 is a front perspective view of a pool cleaner according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
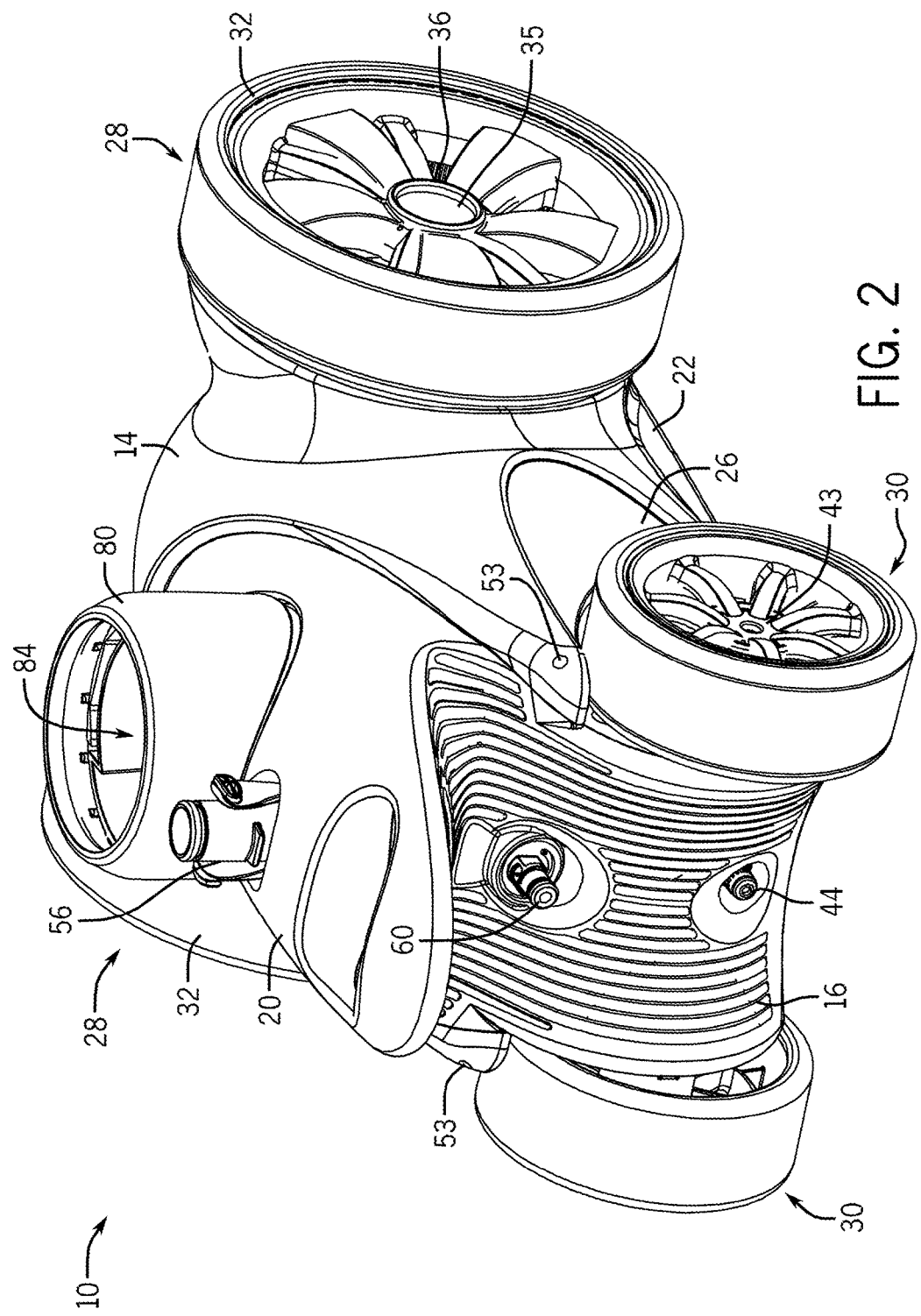
FIG. 2 is a rear perspective view of the pool cleaner of FIG. 1.

FIGS. 1 and 2 illustrate a pool cleaner 10 according to one embodiment of the invention. The pool cleaner 10 can be a pressure-side pool cleaner powered by a filtration pump of a swimming pool system or a booster pump and can be capable of automatically cleaning debris from a floor and/or sides of a swimming pool or spa. The pool cleaner 10 can include precise directional control, enhanced suction, and additional scrubbing capabilities.

Figure 3:
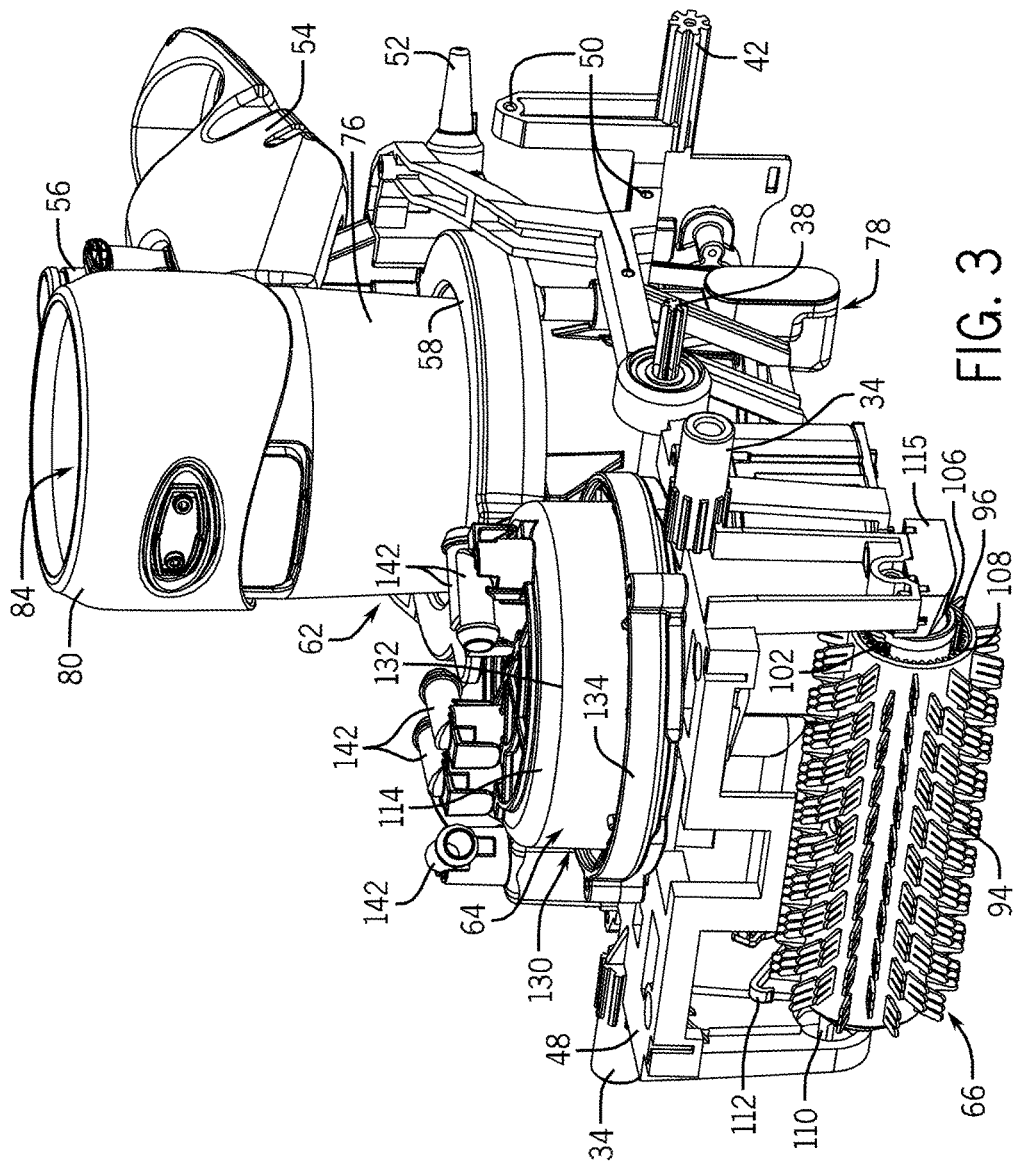
FIG. 3 is a partial front perspective view of the pool cleaner of FIG. 1.
Figure 4:
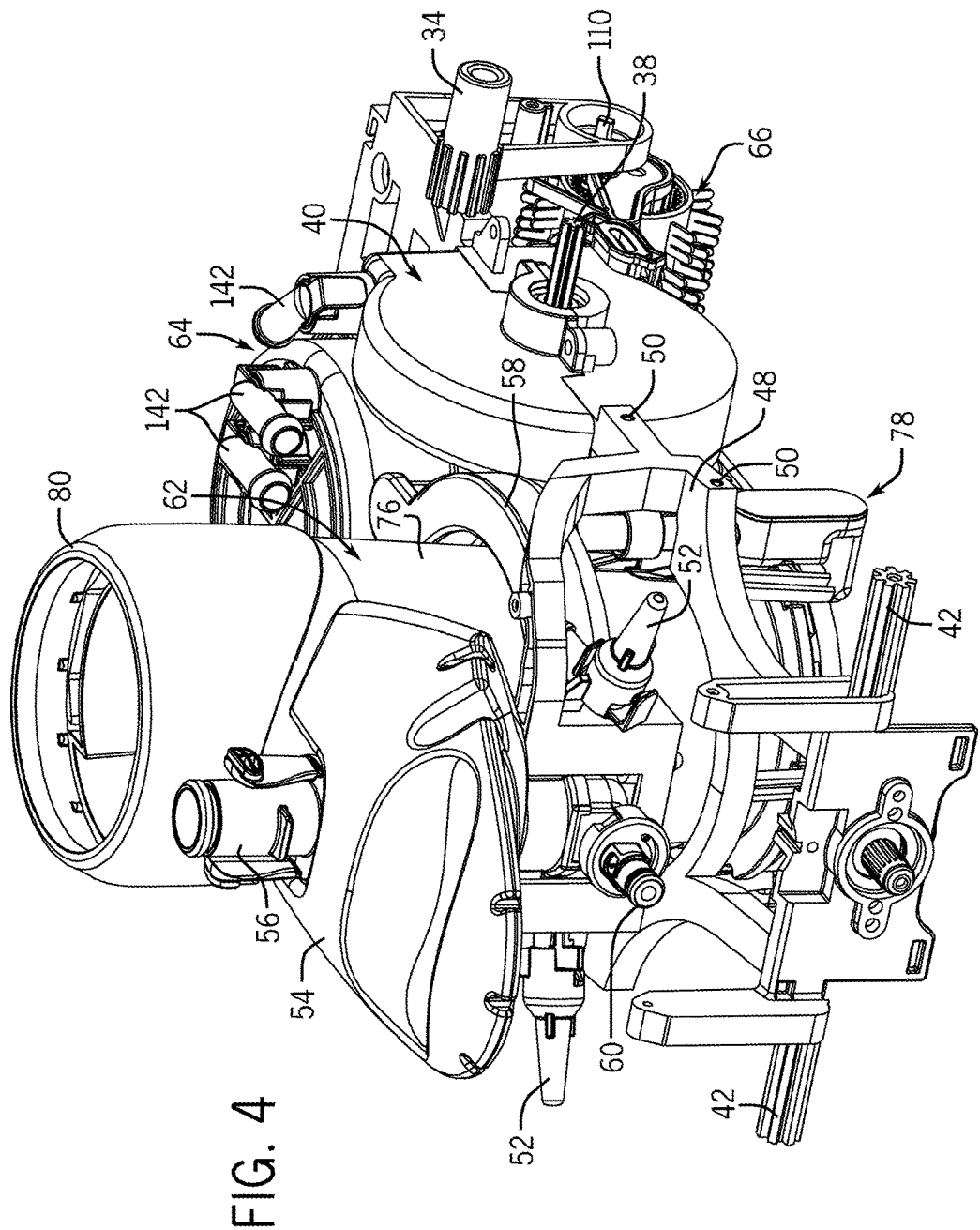
FIG. 4 is a partial rear perspective view of the pool cleaner of FIG. 1.

As shown in FIGS. 1 and 2, the pool cleaner 10 can include a cover assembly 12, including a front cover 14, a rear cover 16, a front grill 18, a top cover 20, a bottom cover 22, and two side covers 24, 26. The pool cleaner 10 can also include two front wheel assemblies 28 and two rear wheel assemblies 30. The front wheel assemblies 28 can include wheels 32 rotatable about stationary axles 34 via hub assemblies 35, as shown in FIGS. 3 and 4. The front wheel assemblies 28 can include inner teeth 36 and can each be driven by a rotating shaft 38 of a hydraulic turbine assembly 40 (as shown in FIG. 4) that engages the inner teeth 36. In one embodiment, the outer portion of each wheel 32 can be substantially smooth. In another embodiment, the outer portion of each wheel 32 can include treads for better traction across the pool surface. The rear wheel assemblies 30 can freely rotate about stationary rear axles 42 via hub assemblies 43 and can also include substantially smooth or treaded outer portions. The four-wheel design of the pool cleaner 10 can provide better stability and resist tipping, in comparison to conventional three-wheel pool cleaners. In some embodiments, the cover assembly 12 and the wheel assemblies 28, 30 can be constructed of plastic or similar materials. In addition to the hydraulic turbine wheel assembly 40, the motion of the pool cleaner can be driven by water forced through thrust jets and/or thrust jet ports, such as a rear thrust jet 44, as shown in FIG. 2, or a front thrust jet port 46, as shown in FIG. 1.

FIGS. 3 and 4 illustrate the pool cleaner 10 with the cover assembly 12 and wheel assemblies 28, 30 removed. As shown in FIGS. 3 and 4, the pool cleaner 10 can include a chassis 48, which can provide structural support for the cover assembly 12 and other components of the pool cleaner 10, as well as the stationary axles 34, 42 for the front wheel assemblies 28 and the rear wheel assemblies 30, respectively. As shown in FIGS. 3 and 4, the chassis 48 can include receiving holes 50 for receiving fasteners in order to couple the cover assembly 12 to the chassis 48. For example, at least some of the components of the cover assembly 12 can be coupled to the chassis 48 using fasteners and the receiving holes 50. In addition, some of the components of the cover assembly 12 can be supported by the chassis 48 and held in place by other components of the cover assembly 12. The pool cleaner 10 can also include turn thrust jets 52 (e.g., in fluid communication with thrust jet ports 53 on the cover assembly 12, as shown in FIG. 2), a float 54, a supply mast 56 connected to a distributor manifold 58, a sweep hose attachment 60 for receiving a sweep hose (not shown), a venturi vacuum assembly 62, a timer assembly 64, and a scrubber assembly 66. Also, in some embodiments, an inner side of the front grill 18 can include a front thrust jet (not shown) in fluid communication with the front thrust jet port 46. The front thrust jet can be integral with the front grill 18 or a separate piece.

Figure 5A:
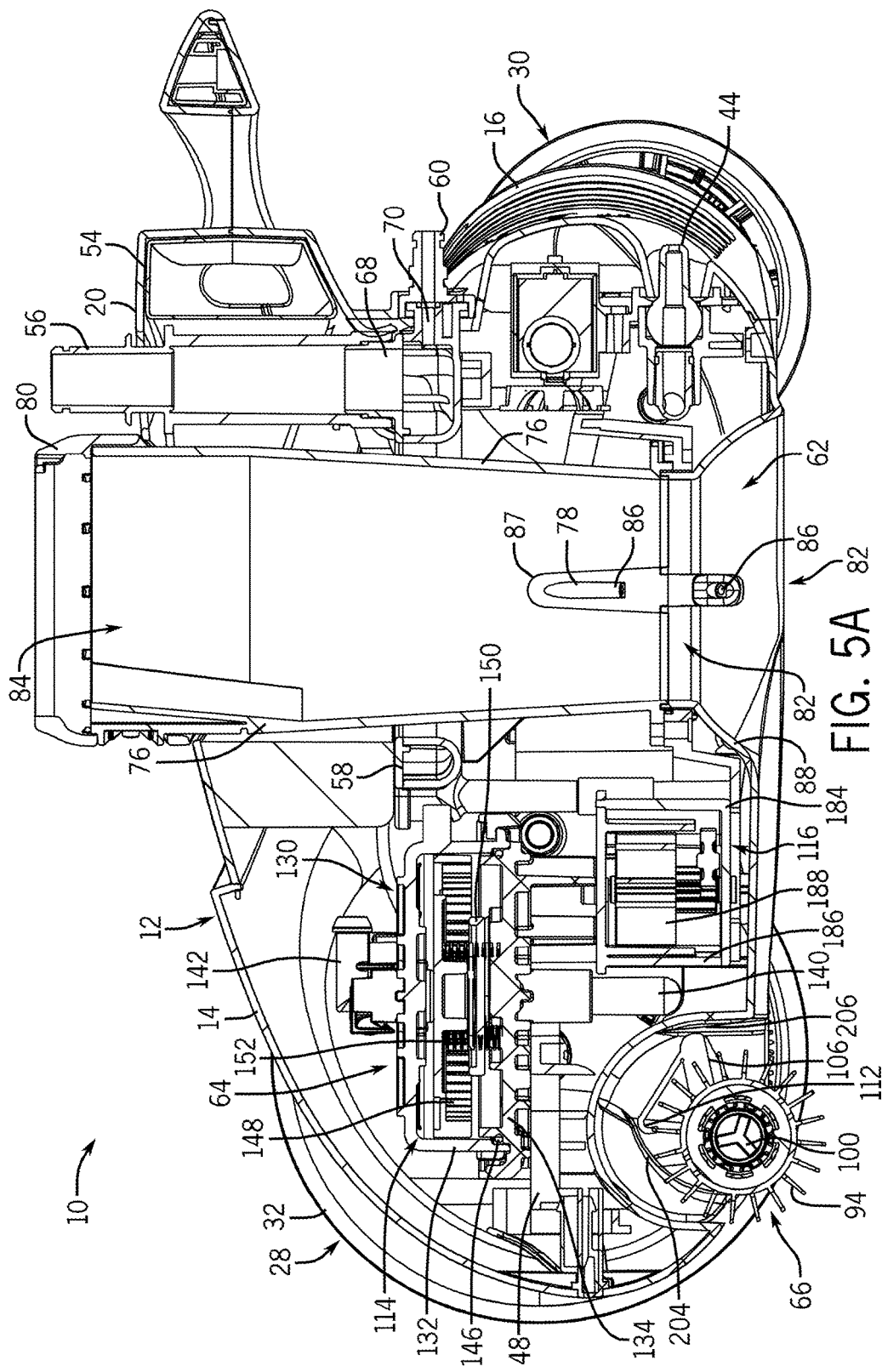
FIG. 5A is a side cross-sectional view of the pool cleaner of FIG. 1.
Figure 5B:
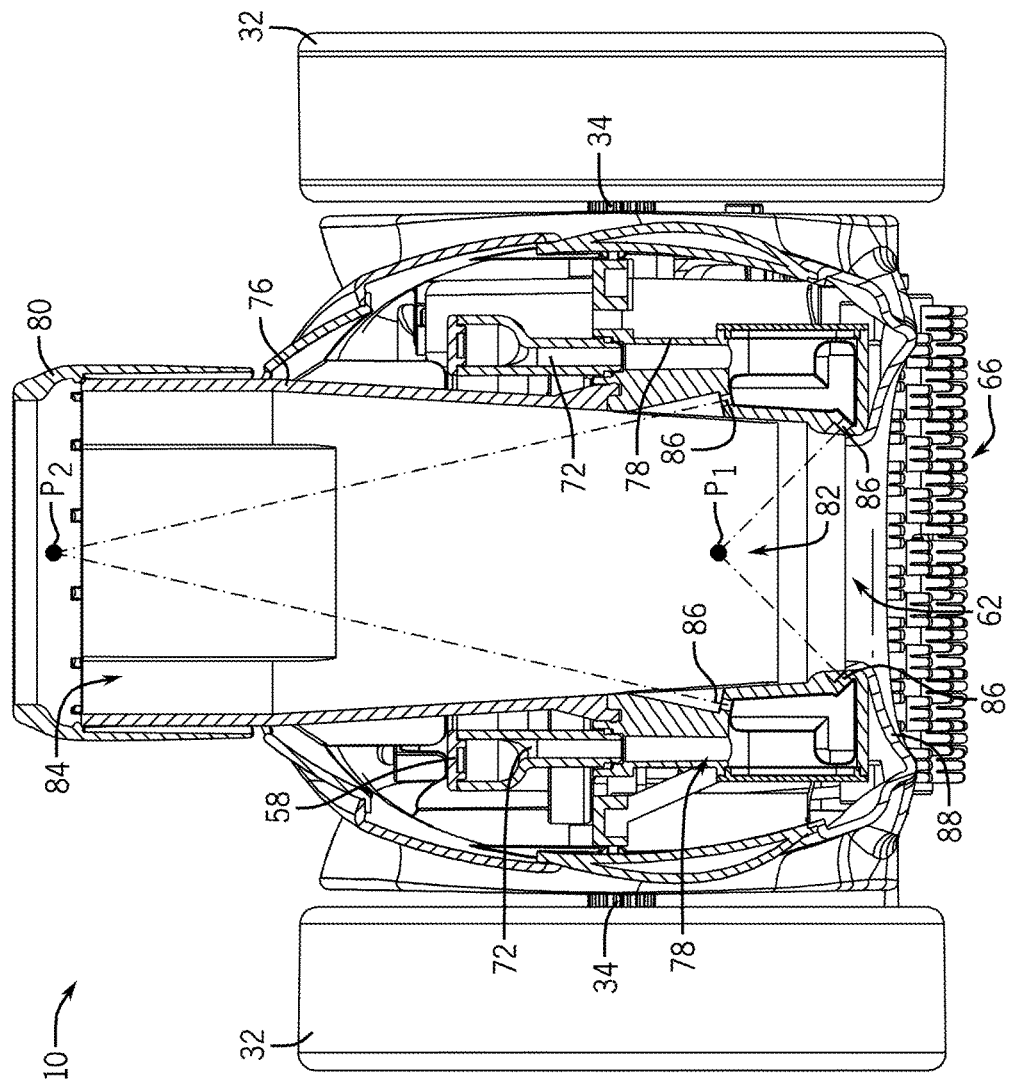
FIG. 5B is a rear cross-sectional view of the pool cleaner of FIG. 1.
Figure 5C:
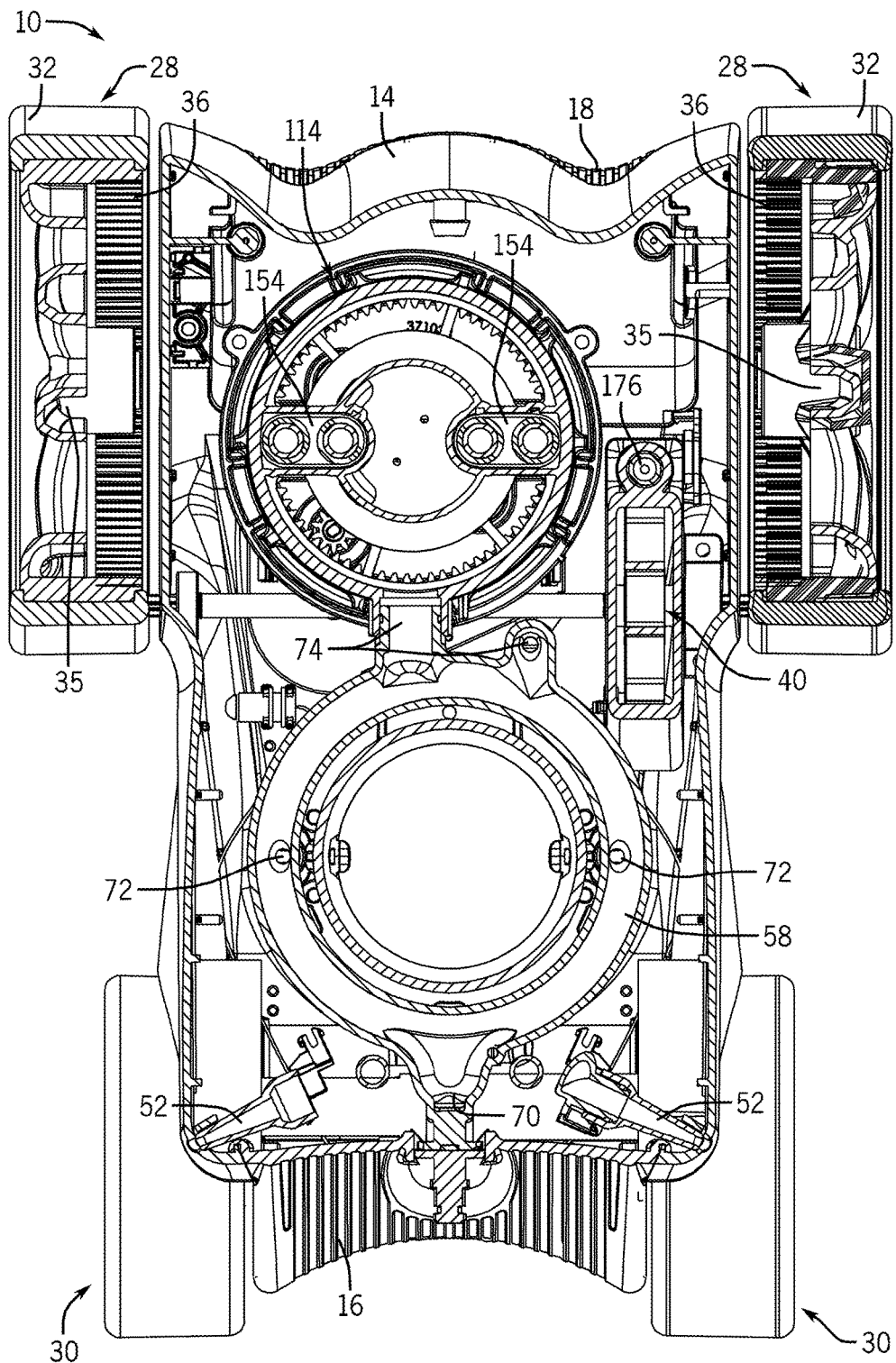
FIG. 5C is a top cross-sectional view of the pool cleaner of FIG. 1.

The supply mast 56 can be coupled to a hose (not shown) that receives pressurized water from the pool pump or booster pump. The supply mast 56 can direct the pressurized water to the distributor manifold 58 for further distribution to specific components of the pool cleaner 10. For example, as shown in FIGS. 5A-5C, the distributor manifold 58 can at least include an inlet 68 coupled to the supply mast 56, an outlet 70 fluidly connected to the sweep hose attachment, one or more outlets 72 fluidly connected to the venturi vacuum assembly 62, and one or more outlets 74 fluidly connected to the timer assembly 64. In some embodiments, as shown FIGS. 3 and 4, the distributor manifold 58 can be substantially ring-shaped and can surround the venturi vacuum assembly 62. In some embodiments, the supply mast 56 can be coupled to the distributor manifold 58 by a press-fit and/or by fasteners. In addition, in some embodiments, the supply mast 56 can also, or alternatively, be coupled to the chassis 48 by a press-fit and/or fasteners.

In some embodiments, the venturi vacuum assembly 62 can vacuum, or pick up, debris from the pool surface and deposit the debris in a debris collection system (not shown) coupled to a suction mast 76. As shown in FIGS. 5A-5B, the venturi vacuum assembly 62 can include the suction mast 76, one or more venturi nozzle assemblies 78, and an attachment collar 80. The suction mast 76 can be substantially cylindrical with an open bottom end 82 and an open top end 84. The attachment collar 80 can be removably coupled to the open top end 84 of the suction mast 76 and can be used to secure the debris collection system, such as a debris bag or a debris canister, to the suction mast 76 for collecting the retrieved debris. The venturi nozzle assemblies 78 can be coupled to or integral with the suction mast 76 near the open bottom end 84 and can each include one or more jet nozzles 86 which provide a flow of pressurized water (e.g., from the distributor manifold 58) up through the suction mast 76 in order to create a pressure difference, or venturi effect, within the suction mast 76. The pressure difference can cause a suctioning effect to vacuum up debris directly under and surrounding the open bottom end 82 of the suction mast 76. In one embodiment, the suction mast 76 can include cut-outs 87 for receiving the nozzle assemblies 78, as shown in FIG. 5A. In addition, in some embodiments, the bottom cover 22 can provide a substantially conical opening 88 that tapers inward toward the open bottom end 82 of the suction mast 76, as shown in FIGS. 5A-5B.

Conventional pressure-side pool cleaners generally include a single-stage venturi system, where the jet nozzles are positioned along a single horizontal plane. In some embodiments, as shown in FIG. 5B, the venturi vacuum assembly 62 can provide multiple stages of jet nozzles 86, where each stage is along a horizontal plane and is vertically offset from another stage. The multi-stage venturi vacuum assembly 62 can more efficiently suction debris from the pool surface, through the suction mast 76, and into the debris bag or canister compared to single-stage venturi systems. More specifically, the multi-stage venturi vacuum assembly 62 can increase water flow through the suction mast 76, and in turn provide improved suction for debris beyond the limits of size and geometry for single-stage venturi systems. For example, a first stage of jet nozzles 86 can lift debris into the suction mast 76 and a second stage of jet nozzles 86 can help move the debris into the debris collection system. In addition, the conical opening 88 tapering outward from the open bottom end 82 can allow larger debris to enter the venturi vacuum assembly 62.

FIGS. 5A-5B illustrate the venturi vacuum assembly 62, according to one embodiment of the invention, with two stages of jet nozzles 86. Each stage can include two jet nozzles 86 directed at an upward angle. For example, the first stage of jet nozzles 86 can be positioned adjacent to the conical opening 88 of the bottom cover 22, below the open bottom end 82 of the suction mast 76. The angles of the two jet nozzles 86 of the first stage can intersect at a point $P_1$ slightly above conical opening 88 (e.g., within the suction mast 76), as shown in FIG. 5B. The second stage jet nozzles 86 can be positioned around the periphery of the suction mast 76, near the open bottom end 82 of the suction mast 76 (e.g., vertically above the first stage jet nozzles 86). The angles of the two jet nozzles 86 of the second stage can intersect at a point $P_2$ that is above the intersection point $P_1$ of the first stage jet nozzles 86. In operation, pressurized water is forced through the first stage venturi jets 86 for initial suction of the debris directly under and/or around the conical opening 88. Pressurized water is also forced through the second stage venturi jets 86 for additional suction action in order to lift the debris through the suction mast 76 and into the debris collection system.

Figure 6A:
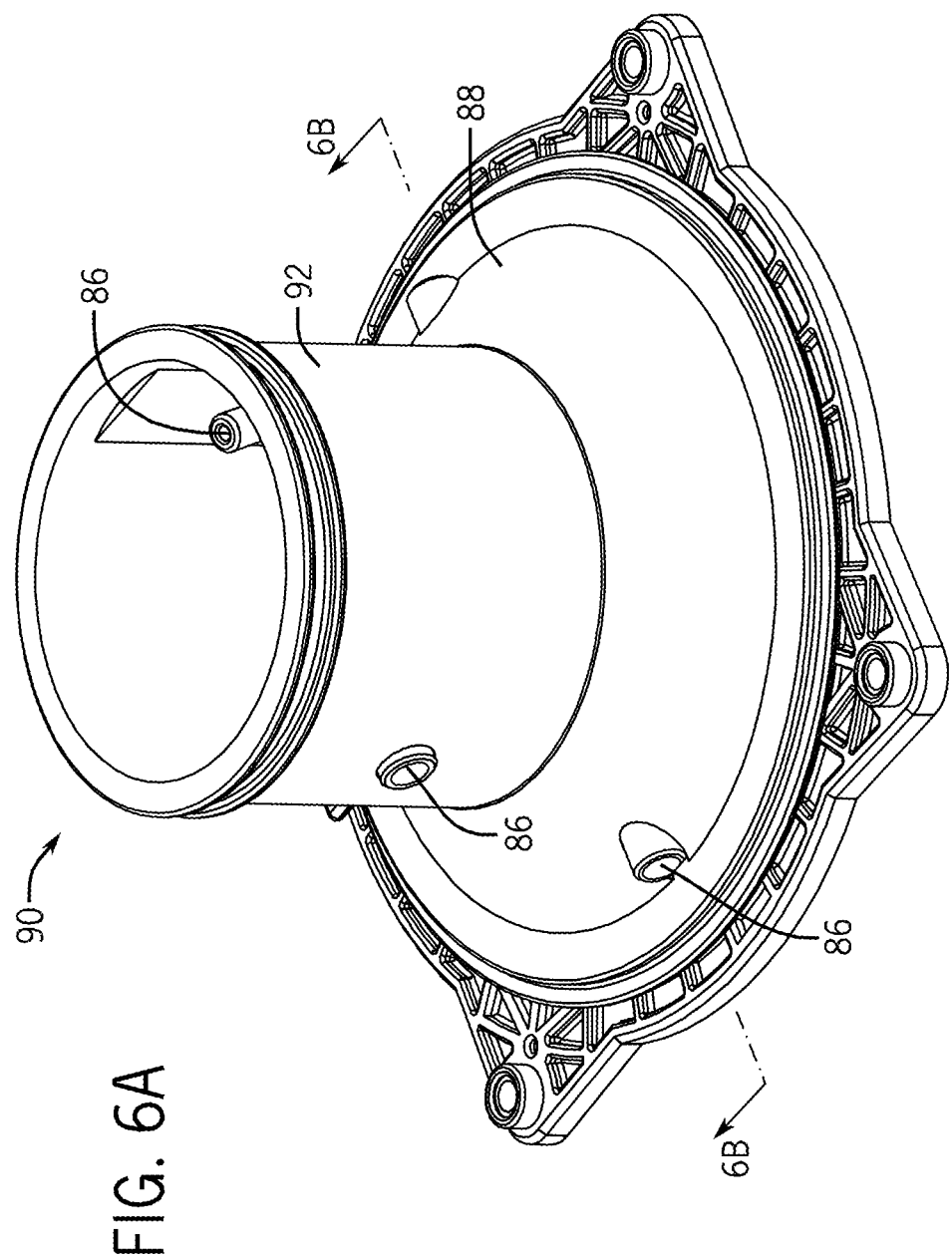
FIG. 6A is a perspective view of a lower manifold for use with a pool cleaner according to another embodiment of the invention.
Figure 6B:
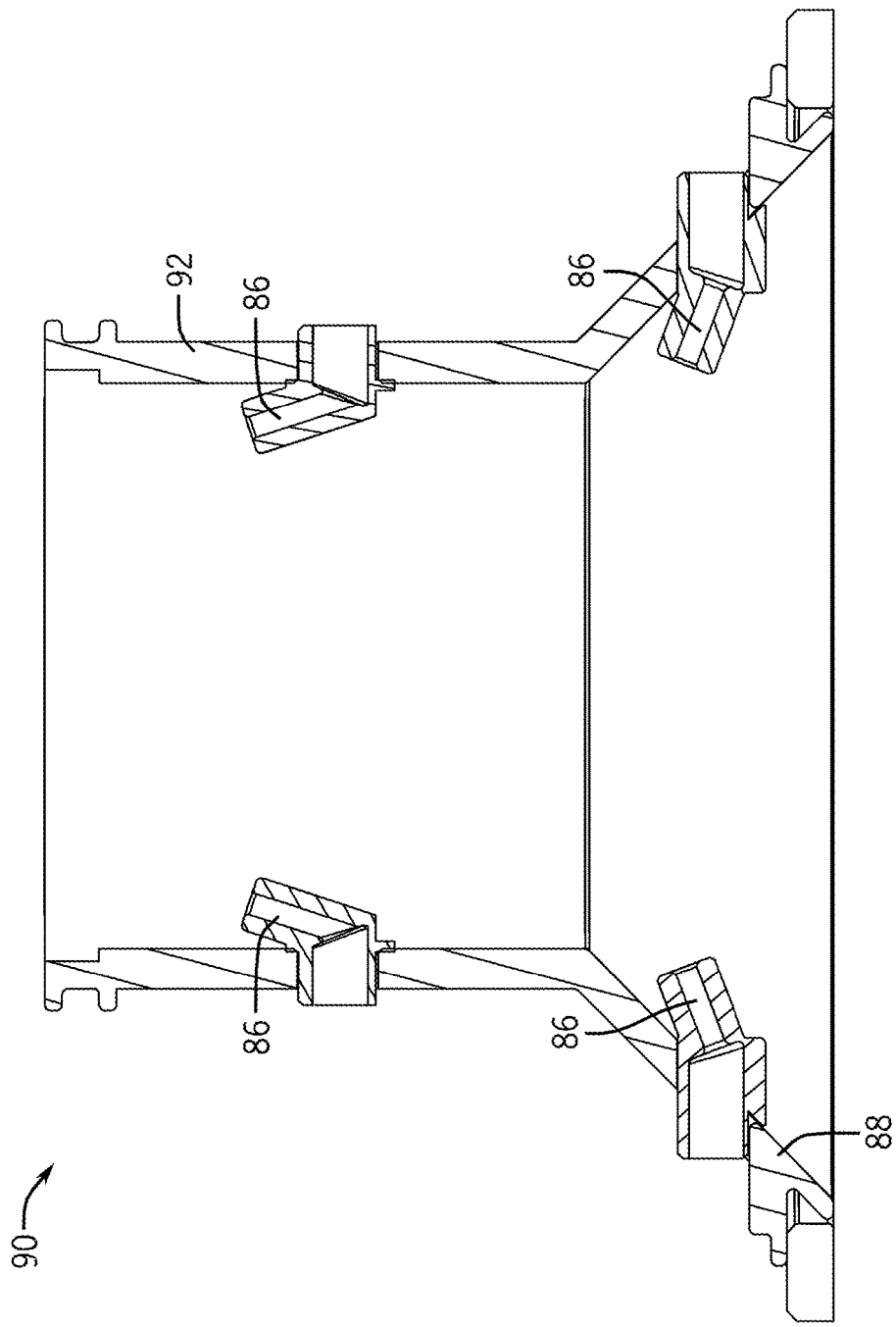
FIG. 6B is a side cross-sectional view of the lower manifold of FIG. 6A.

In some embodiments, as shown in FIGS. 6A-6B, the venturi vacuum assembly 62 can include a separate lower manifold 90 that can be press-fit or fastened to the suction mast 76 and/or the bottom cover 22. The lower manifold 90 can include the conical opening 88 with a first stage of jet nozzles 86, and a cylindrical section 92, positioned above the conical opening 88, including a second stage of jet nozzles 86. In such embodiments, the venturi vacuum assembly 62 can also include connector assemblies (not shown), which provide fluid pathways from the outlet ports 72 of the distributor manifold 58 to the jet nozzles 86. In other embodiments, the jet nozzles 86 and/or the conical section 88 can be integral with the suction mast 76. In addition, in some embodiments, the jet nozzles 86 may be flush with the conical section 88, the suction mast 76, and/or the lower manifold 90, as shown in FIGS. 5A-5B, or the jet nozzles 76 may extend outward from the conical section 88, the suction mast 76, and/or the lower manifold 90, as shown in FIGS. 6A-6B.

In some embodiments, as shown in FIGS. 7A-8C, the scrubber assembly 66 can be used as an add-on cleaning feature of the pool cleaner 10. As the pool cleaner 10 travels along the pool surface, the scrubber assembly 66 can provide sweeping and scrubbing action against the pool surface in order to lift and agitate debris. This can increase the amount of debris that is picked up by the venturi vacuum assembly 62. The scrubber assembly 66 may be attached to the pool cleaner 10 at all times, or may be detached by a user when scrubbing is deemed unnecessary. More specifically, the pool cleaner 10 may operate without the scrubber assembly 66 attached, unlike many conventional pool cleaners with permanent scrubbers.

Figure 7A:
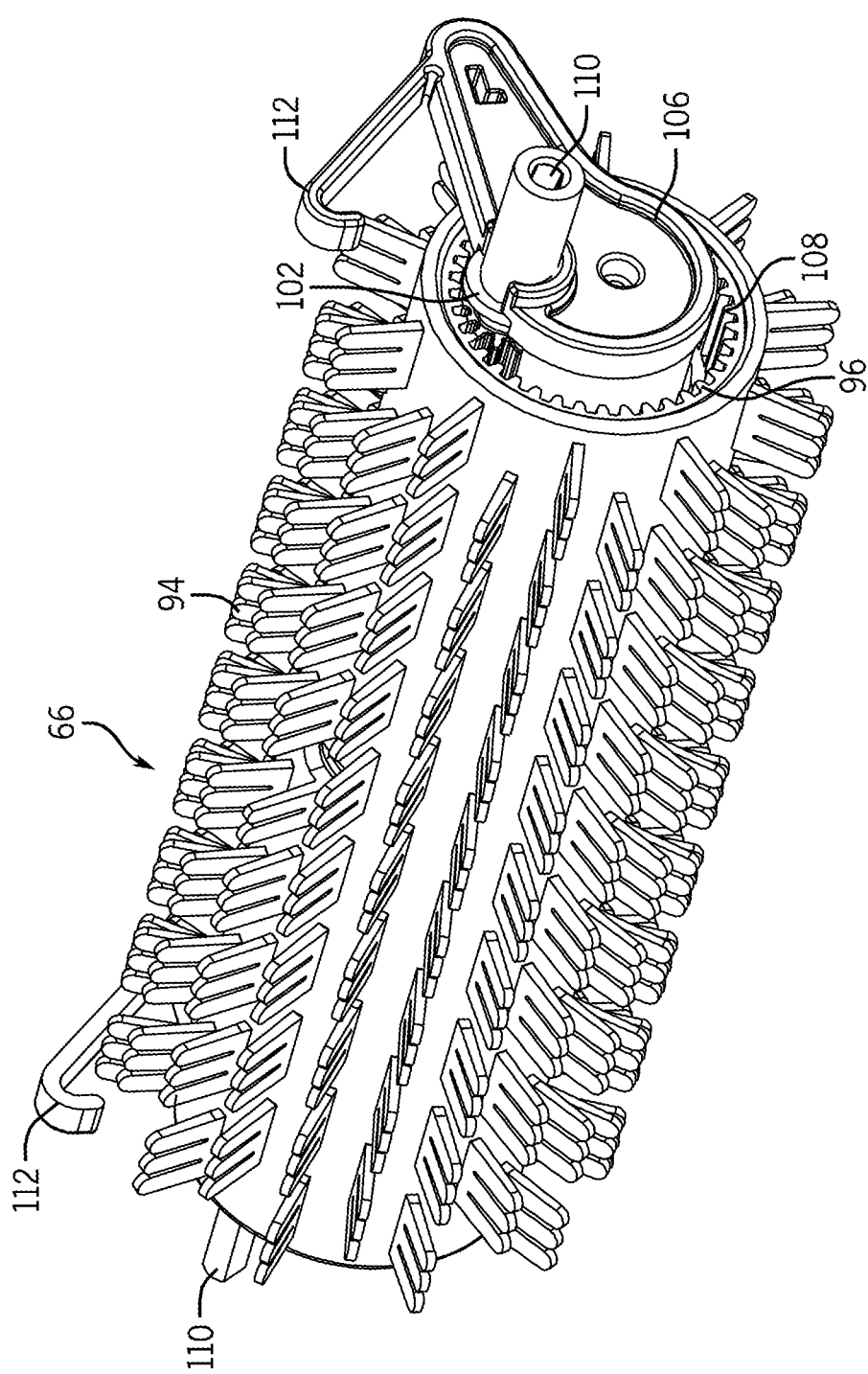
FIG. 7A is a perspective view of a scrubber assembly of the pool cleaner of FIG. 1.
Figure 7B:
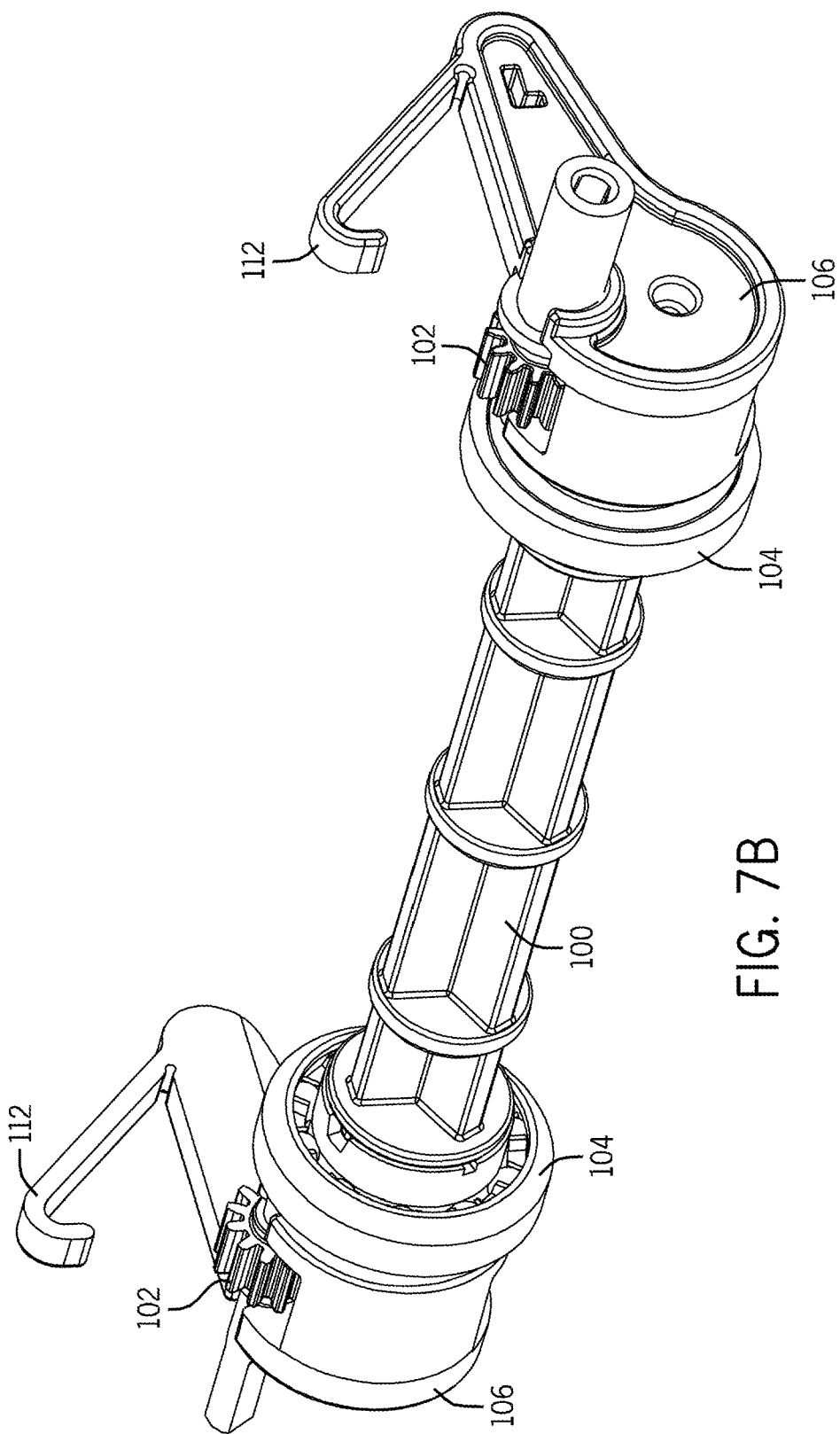
FIG. 7B is a partial perspective view of the scrubber assembly of FIG. 7A.
Figure 8A:
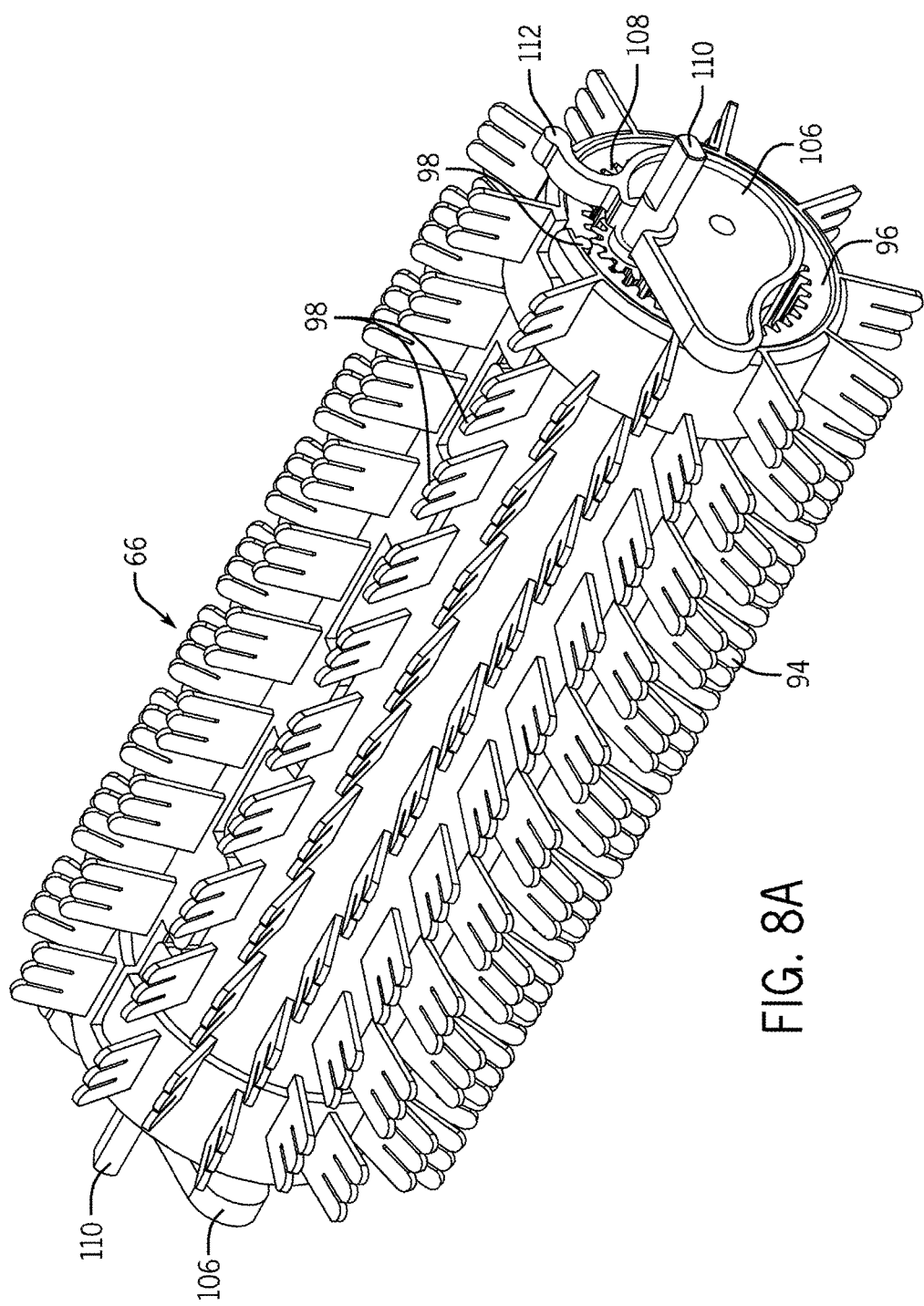
FIG. 8A is a perspective view of a scrubber assembly for use with a pool cleaner according to another embodiment of the invention.
Figure 8B:
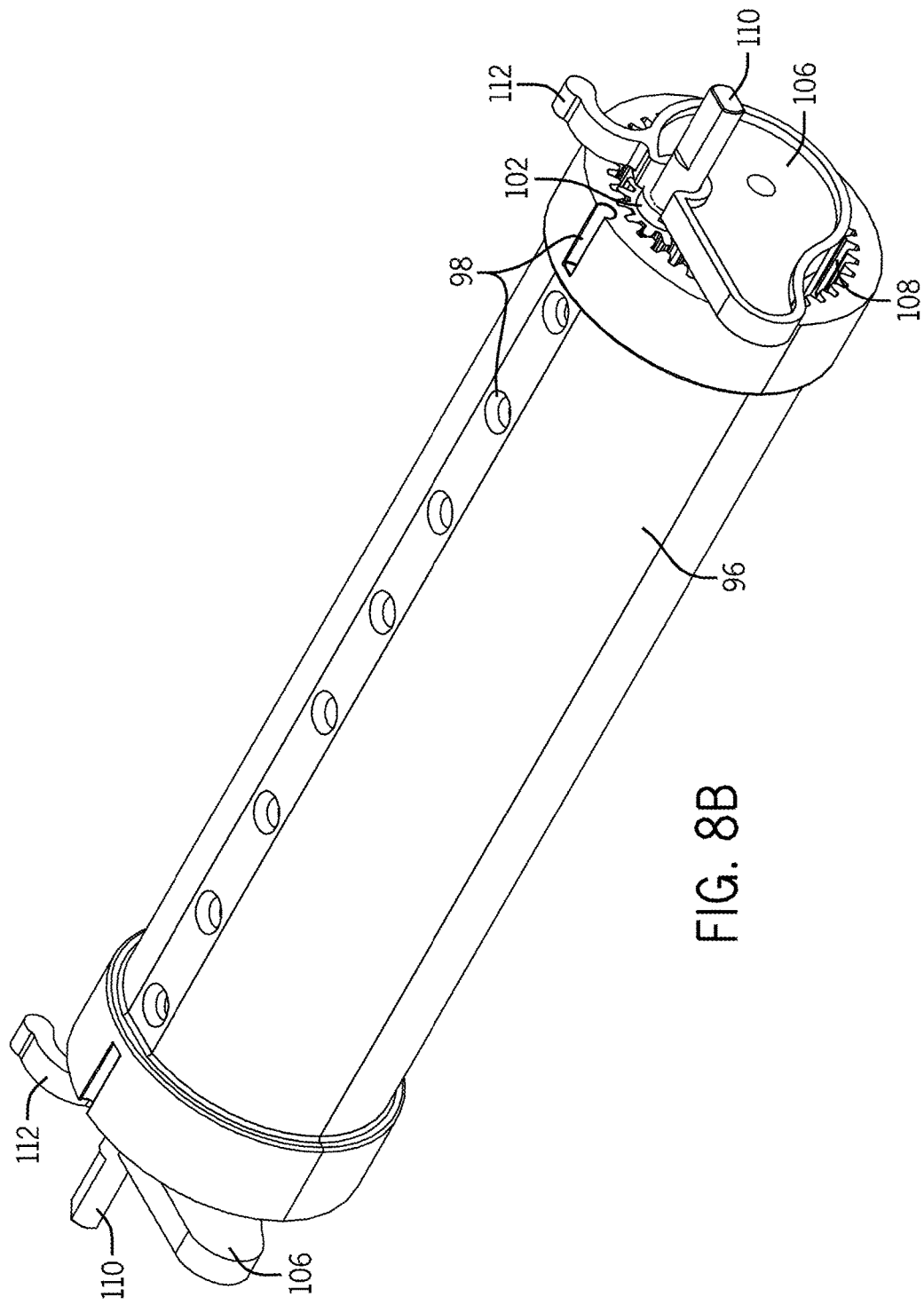
FIG. 8B is a partial perspective view of the scrubber assembly of FIG. 8A.
Figure 8C:
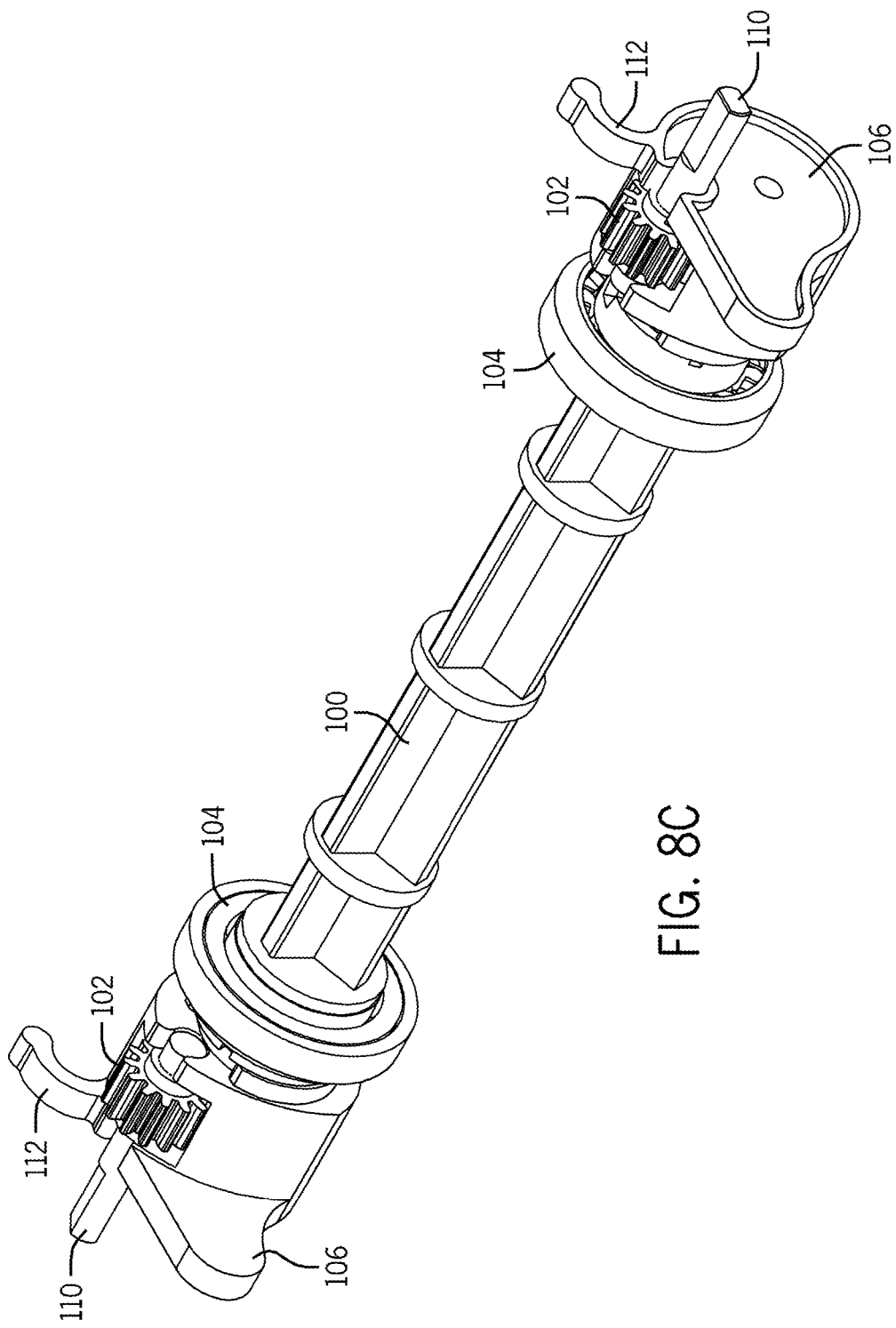
FIG. 8C is another partial perspective view of the scrubber assembly of FIG. 8A.

In some embodiments, the scrubber assembly 66 can include an elastomeric bristle 94 coupled to a rotary cylinder 96. For example, as shown in FIGS. 8A and 8B, portions of the elastomeric bristle 94 and portions of the rotary cylinder 96 can each include snap-on fittings 98 so that the elastomeric bristle 94 can be wrapped around the rotary cylinder 96 and the respective snap-on fittings 98 snapped together. As shown in FIGS. 7B and 8C, the scrubber assembly 66 can also include a center shaft 100, and pinion gears 102, bearings 104, and end brackets 106 at each end of the center shaft 100. The end brackets 106 can each house or at least support one of the pinion gears 102 and can be coupled to the center shaft 100. The center shaft 100 can provide support for the rotary cylinder 96 and the bearings 104 (e.g., ball bearings) can allow free rotation of the rotary cylinder 96 about the center shaft 100.

Figure 7C:
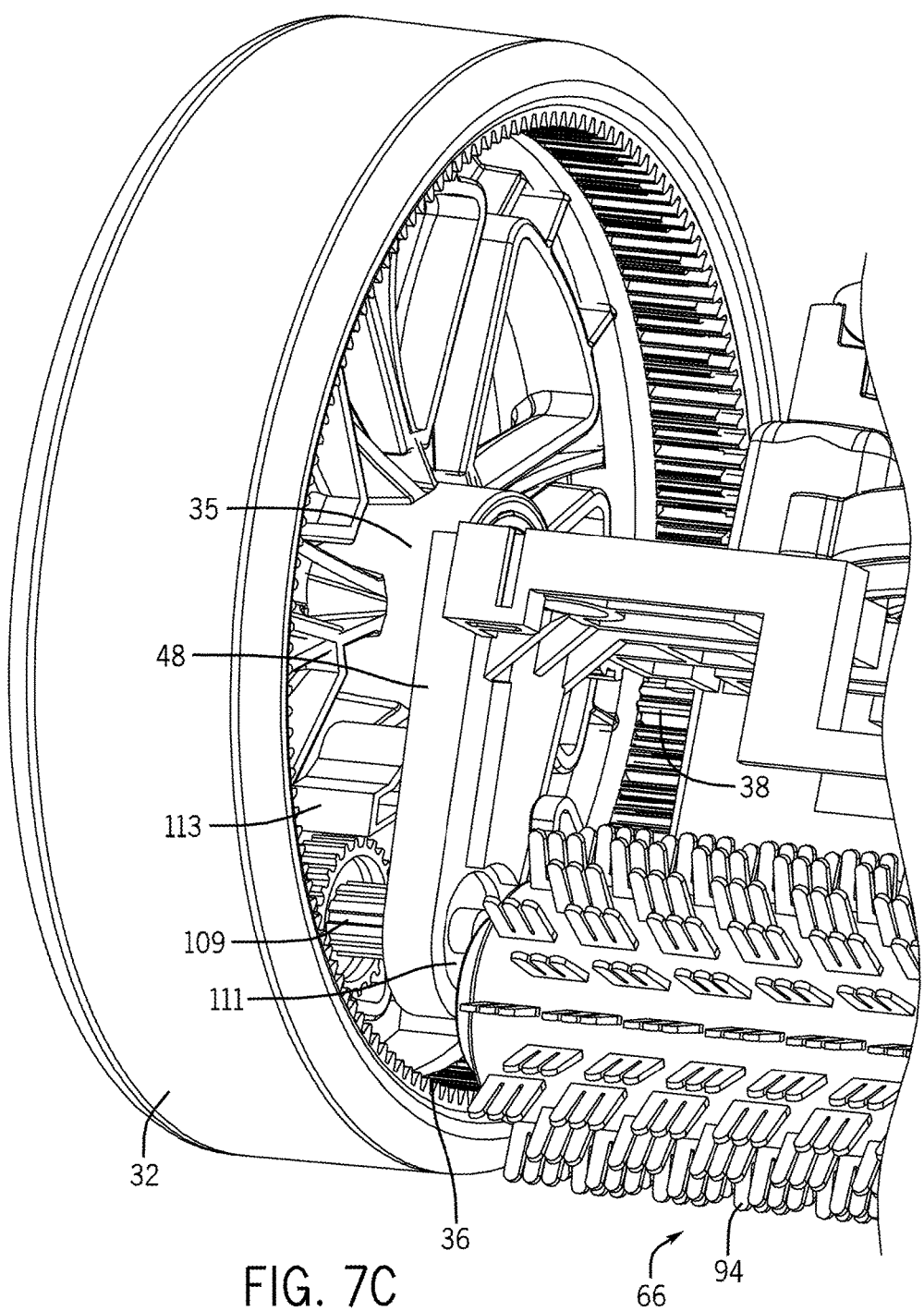
FIG. 7C is a partial perspective view of the pool cleaner of FIG. 1.

The pinion gears 102 can control the rotation of the rotary cylinder 96. More specifically, the rotary cylinder 96 can include an internal spur gear profile 108 on one or both ends, as shown in FIGS. 7A and 8A, which can engage the pinion gears 102. At least one of the pinion gears 102 can be engaged with a spur gear 109, which is further engaged with the inner teeth 36 of at least one of the front wheel assemblies 28, as shown in FIG. 7C. As a result, forward and/or backward rotation of the front wheel assemblies 28 can drive rotation of the rotary cylinder 96 in the same direction. The pinion gear 102 can engage the spur gear 109 via a pinion gear shaft 110. The spur gear 109 can extend through a bearing 111 positioned in the chassis 48 to engage the pinion gear shaft 110. In addition, a bracket 113 can be positioned adjacent to the front wheel assembly 28 to support the spur gear 109.

As discussed above, the scrubber assembly 66 can be removed or detached from the pool cleaner 10. For example, the chassis 48 can include a detachable piece 115, as shown in FIG. 3. The detachable piece 115 can be screwed onto or otherwise coupled to the chassis 48 around one the of the pinion gear shafts 110 (e.g., on the opposite side from the spur gear 109). More specifically, the detachable piece 115 can be detached from the chassis 48, the scrubber assembly 66 can then be engaged with the spur gear 109 (e.g., to attach the scrubber assembly 66) or pulled away from the spur gear 109 (e.g., to detach the scrubber assembly 66), and then the detachable piece 115 can be reattached to the chassis 48. In some embodiments, at least a portion of the pinion gear shaft 110 can be spring loaded (e.g., biased away from the end brackets 106) to aid in attachment or detachment of the scrubber assembly 66 from the pool cleaner 10. As a result of the scrubber assembly 66 being coupled to the chassis 48 by the detachable piece 115, the scrubber assembly 66 can be removed or attached to the pool cleaner 10 without requiring removal of one or both front wheel assemblies 28.

As shown in FIGS. 7A-8C, the pinion gears 102 can be aligned off-center from the center shaft 100. As a result, the end brackets 106, as well as the other components of the scrubber assembly 66, can swing about the pinion gears 102, allowing the scrubber assembly 66 to substantially lift itself over objects or large debris on the pool surface. Thus, the scrubber assembly 66 can provide additional floor sweeping during forward and/or reverse motion of the pool cleaner 10 without damaging the pool surface. For example, the scrubber assembly 66 can lift itself over large particles to avoid pushing such particles across the pool surface. In addition, the elastomeric bristle 94 can be soft enough to not cause wear along the pool surface.

The end brackets 106 of the scrubber assembly 66 can each include an arm 112 that can limit the swing or lift of the scrubber assembly 66. In some embodiments, the arms 112 can be substantially resilient (e.g., acting as spring members). As shown in FIG. 5A, the bottom cover 22 can include a front step 204 and a rear step 206. The front step 204 and/or the rear step 206 can be indentations or curvatures across the length of the bottom cover 22 or indentations located only adjacent to the arms 112. During forward movement of the pool cleaner 10, the scrubber assembly 66 can lift over an object causing the end brackets 106 to rotate around the pinion gears 102 in a forward direction (e.g., in a counterclockwise direction relative to the side view shown in FIG. 5A). After a certain amount of forward rotation, the arms 112 can contact the front step 204, thus limiting the rotation of the scrubber assembly 66. The arms 112 can compress against the front step 204 as the pool cleaner 10 continues to move over the object and, in part due to their resiliency, can force the end brackets 106 to rotate back to their original position when the object has been passed over. In a similar fashion, during backward movement of the pool cleaner 10, the scrubber assembly 66 can lift over an object causing the end brackets 106 to rotate around the pinion gears 102 in a backward direction (e.g., in a clockwise direction relative to the side view shown in FIG. 5A). After a certain amount of backward rotation, the arms 112 can contact the rear step 206, thus limiting the rotation of the scrubber assembly 66. Gravity and/or spring action of the arms 112 can force the end brackets 106 to rotate back to their original, resting position when the object has been passed over.

In some embodiments, the timer assembly 64 can control forward movement, turning, and reverse movement of the pool cleaner 10. The timer assembly 64 can also control the timing for each movement state (e.g., forward movement, reverse movement, and one or more turning movements) of the pool cleaner 10. As described above, the timer assembly 64 can receive water from the distributor manifold 58. The timer assembly 64 can redirect the incoming water from the distributor manifold 58 to control the movement state of the pool cleaner 10, as described below.

Figure 9:
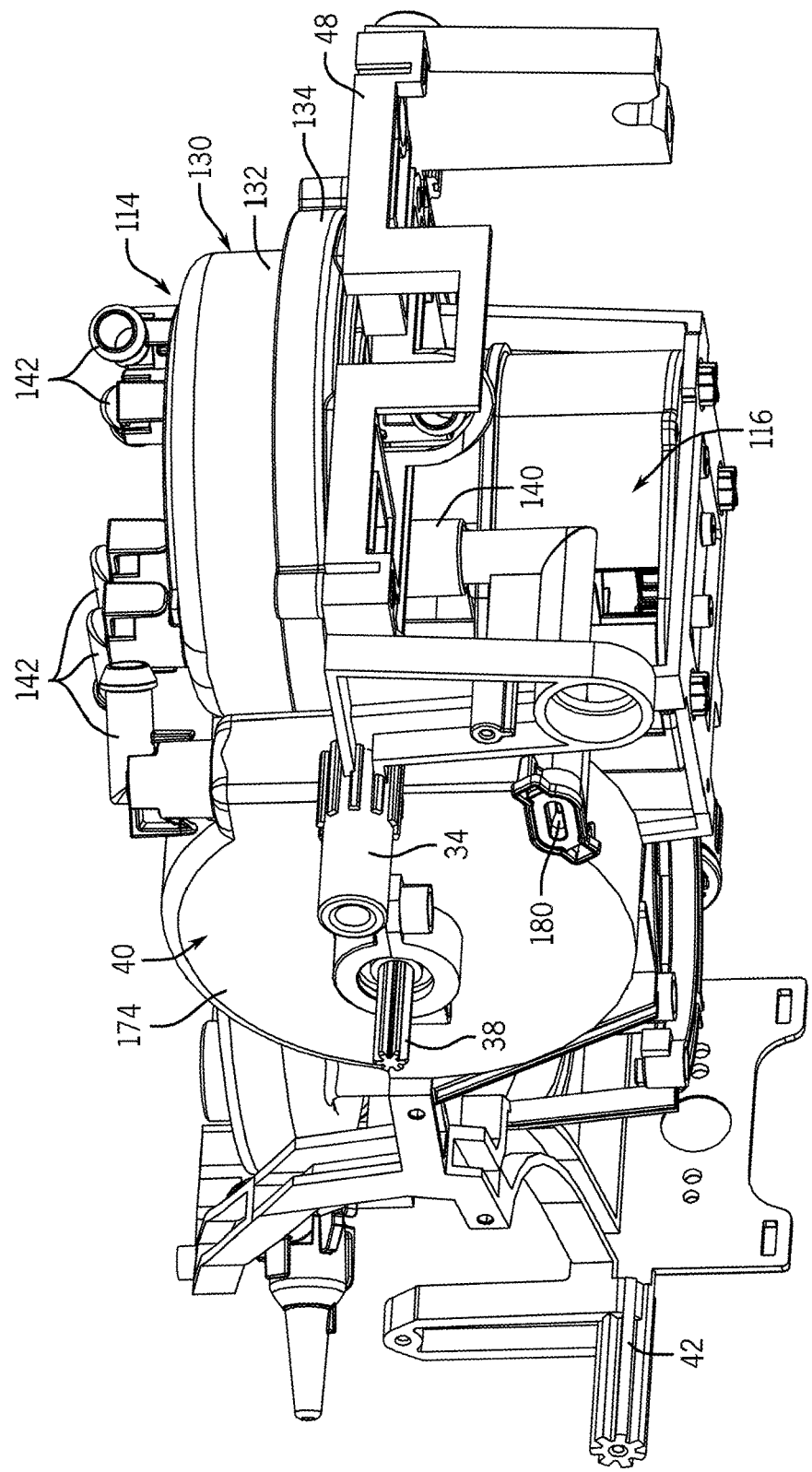
FIG. 9 is a partial bottom perspective view of the pool cleaner of FIG. 1.
Figure 10:
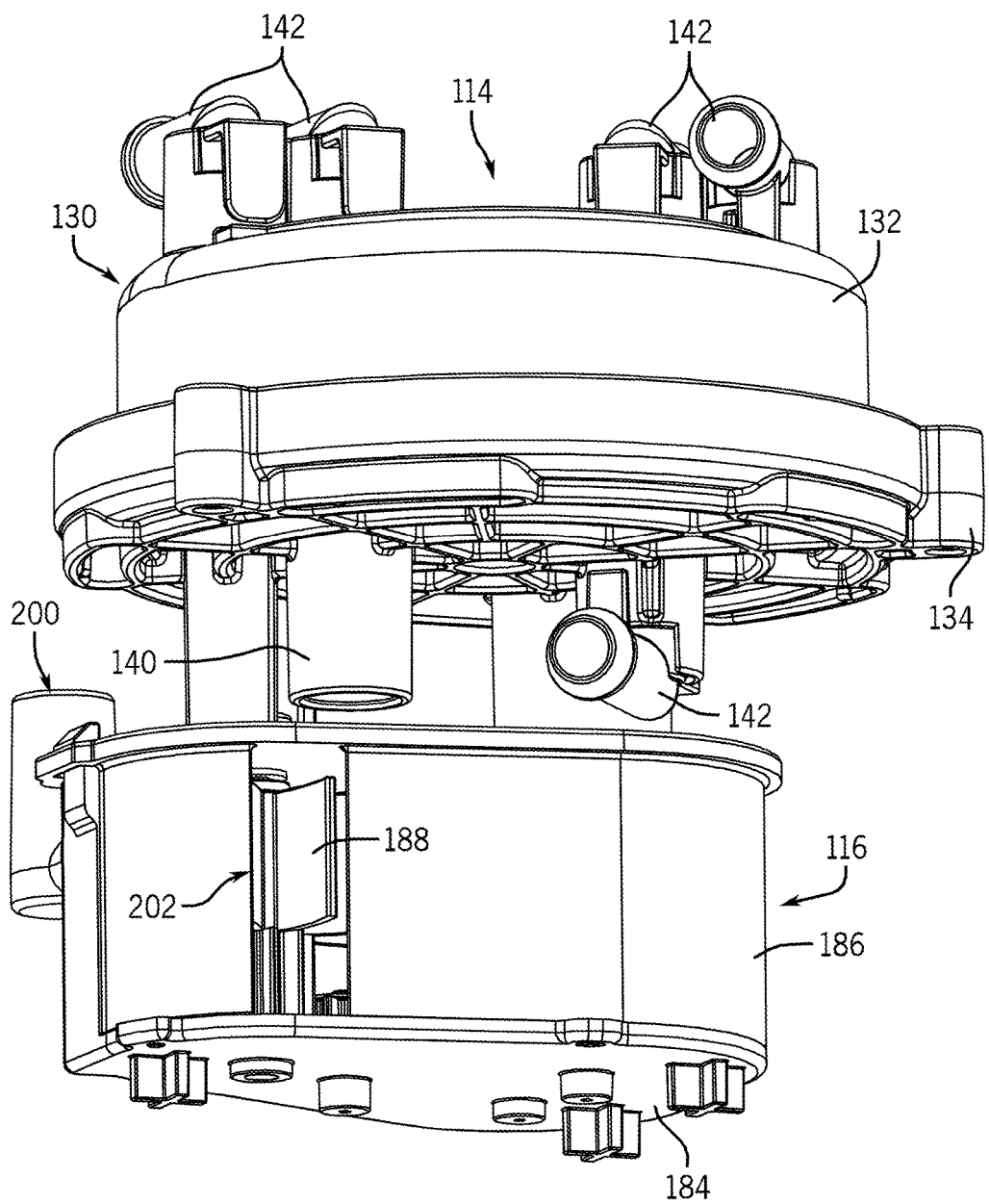
FIG. 10 is a perspective view of a timer assembly of the pool cleaner of FIG. 1.
Figure 11:
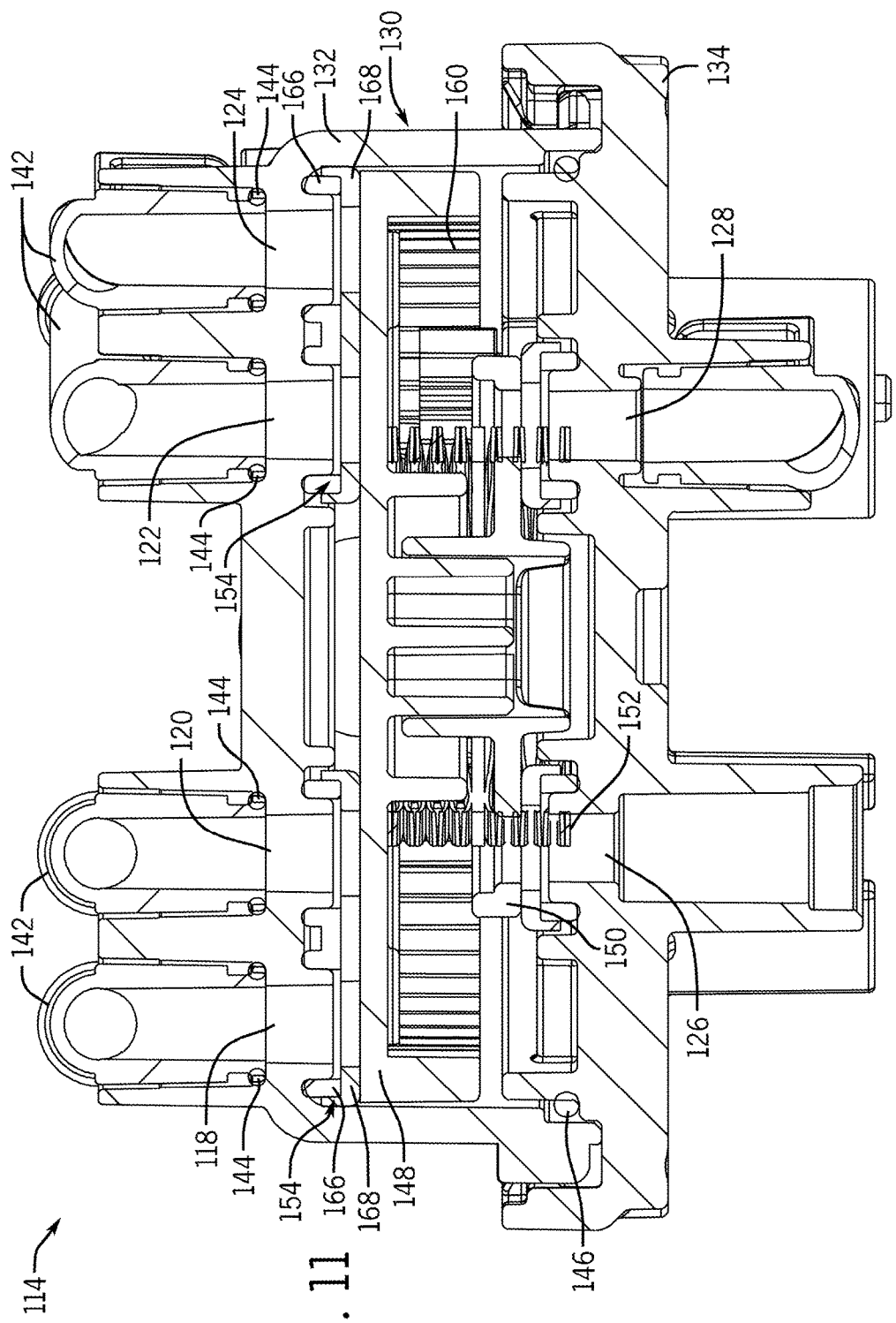
FIG. 11 is a side cross-sectional view of a timer disc assembly of the timer assembly of FIG. 10.

As shown in FIGS. 9 and 10, the timer assembly 64 can include a timer disc assembly 114 and a timer valve gear box 116. The timer disc assembly 114 can provide alignment of fluid pathways between the incoming water from the distributor manifold 58 and different outlet ports 118-128, as shown in FIG. 11, for control of the movement state of the pool cleaner 10. The timer valve gear box 116 can provide a hydraulic timer that controls the alignment of the fluid pathways in the timer disc assembly 114 so that the pool cleaner 10 is in a specific movement state for a set or predetermined time period.

Figure 12:
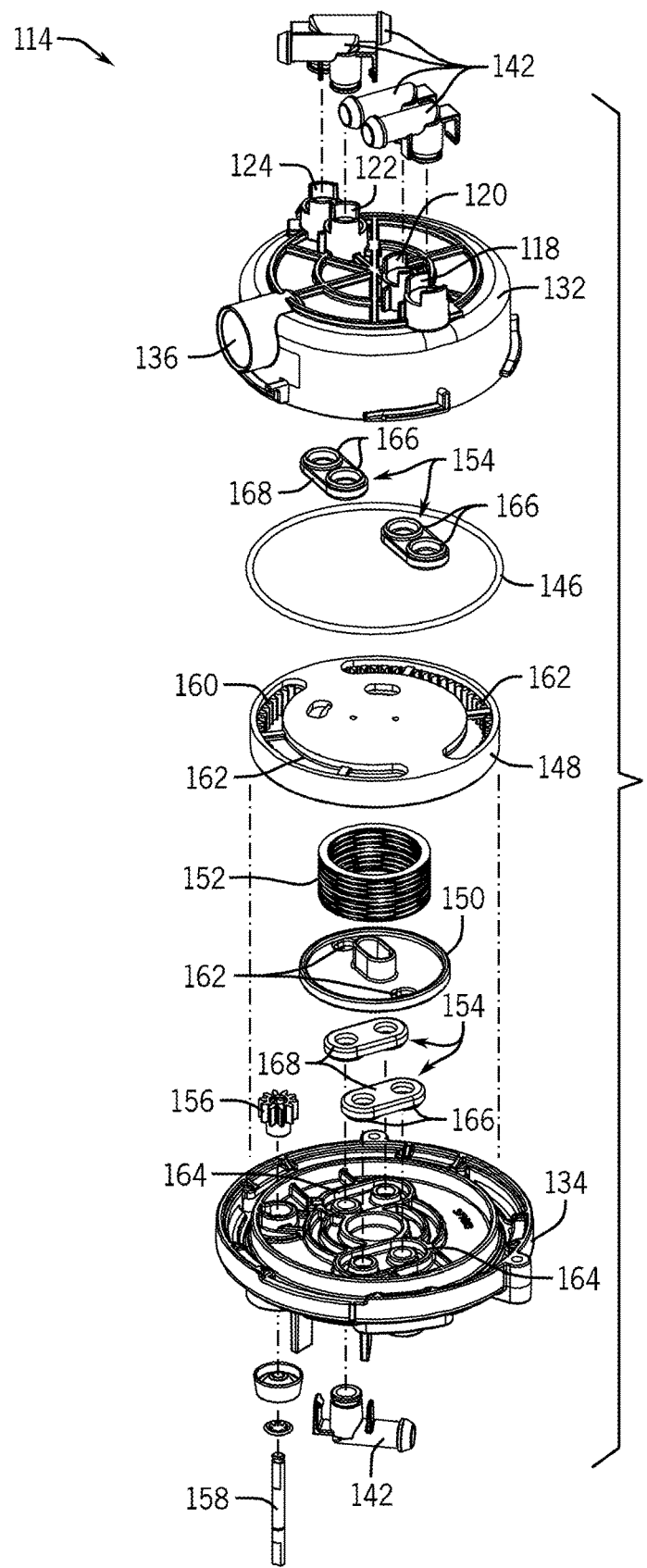
FIG. 12 is an exploded perspective view of the timer assembly of FIG. 11.

As shown in FIGS. 9-12, the timer disc assembly 114 can include an outer housing 130, such as a top cover 132 and a bottom cover 134. The outer housing 130 can include an inlet port 136, as shown in FIG. 12, which can receive water from the distributor manifold 58 and a plurality of outlet ports 118-128 which can provide water to one or more locations of the pool cleaner 10, as described below. The inlet port 136 and the outlet ports 118-128 can merely be holes extending through a portion of the outer housing 130, or can also include extensions from the outer housing 130 to facilitate coupling connectors (e.g., a distributor manifold connector 138 or a chassis connection 140) or port elbows 142 to the outer housing 130. In one embodiment, as shown in FIGS. 11 and 12, the outer housing 130 can include four outlet ports 118-124 extending through the top cover 132 and two outlet ports 126, 128 extending through the bottom cover 134. In addition, o-rings 144 can be positioned between the port elbows 142 and the outer housing 130 so that water exiting the outlet ports 118-126 may only exit through the port elbows 142. In some embodiments, some of the port elbows 142 can be substituted with stand-alone connectors or connectors integral with the chassis 48 or cover assembly 12 (not shown).

The outer housing 130 can be substantially sealed, for example by one or more seals 146, press-fitting, and/or fasteners (not shown) so that water entering the inlet port 136 can only exit the outer housing 130 via the outlet ports 118-128. Internal components of the timer disc assembly 114, as further described below, can control which outlet ports 118-128 the water may exit from. More specifically, the internal components can periodically block or unblock one or more of the outlet ports 118-128 and the pool cleaner 10 can be driven in a specific movement state depending on which of the outlet ports 118-128 are blocked and unblocked.

In some embodiments, as shown in FIGS. 11 and 12, the timer disc assembly 114 can include one or more timer discs 148, 150, a spring 152, one or more port seal liners 154, a pinion gear 156, and a pinion gear shaft 158. The timer discs 148, 150, the spring 152, the port seal liners 154, and the pinion gear 156 can be substantially enclosed by the outer housing 130. The pinion gear shaft 158 can extend through the outer housing 130 and into the timer valve gear box 116. As further described below, the pinion gear shaft 158 can be rotated by components within the timer valve gear box 116. Rotation of the pinion gear shaft 158 can cause rotation of the pinion gear 156 within the outer housing 130, and one or both of the timer discs 148, 150 can be rotated by the pinion gear 156. For example, as shown in FIG. 11, the larger timer disc 148 can include a toothed portion 160 engaging with the pinion gear 156. In addition, the larger timer disc 148 can be coupled to or can engage with the smaller timer disc 150 so that both timer discs 148, 150 can rotate in unison.

Each of the timer discs 148, 150 can include one or more slots 162 extending through them, as shown in FIG. 12. The slots 162 can be located along the timer discs 148, 150 so that, during the respective rotations of the timer discs 148, 150, the slots 162 can align with one or more of the outlet ports 118-128, allowing water to exit the outer housing 130 via the respective outlet ports 118-128 and/or the timer discs 148, 150 can substantially block one or more of the outlet ports 118-128, preventing water to exit the outer housing 130 via the respective outlet ports 118-128. The port seal liners 154 can be positioned between the outlet ports 118-128 and the timer discs 148, 150 in order to permit water out through the outlet ports 118-128 only when one of the slots 162 of the timer discs 148, 150 is aligned with the respective outlet ports 118-128. The spring 152 can substantially force the timer discs 148, 150 away from each other and against the outer housing 130. This can result in a better seal between the port seal liners 154 and the timer discs 148, 150. In some embodiments, as shown in FIG. 12, the outer housing 130 can include outlined cavities 164 which can each receive at least a portion of a port seal liner 154 in order to keep the port seal liner 154 correctly positioned adjacent to the outlet ports 118-128 and prevent the port seal liner 154 from moving during rotation of the timer discs 148, 150.

In some embodiments, as shown in FIGS. 11 and 12, each of the port seal liners 154 can include an elastomeric piece 166 molded onto a lower density liner 168. As the stationary port seal liner 154 is in contact with one of the rotating timer discs 148, 150, the lower density liner 168 can provide less friction (e.g., from shear stresses) between the port seal liner 154 and the rotating timer disc 148, 150 in comparison to conventional seals only using an elastomeric piece. This can reduce the wear and increase the lifetime of the port seal liner 154. The elastomeric piece 166 of the port seal liner 154 can act as a spring to engage the seal between the port seal liner 154 and the outlet port 118-128. As shown in FIG. 12, each port seal liner 154 can include two holes, and as a result, can seal one or two outlet ports 118-128. In some embodiments, one or more port seal liners 154 can include a single hole so that one or more outlet ports 118-128 can be aligned with their own respective port seal liner 154.

As described above, the pool cleaner 10 can be driven in a specific movement state depending on which of the outlet ports 118-128 are blocked and unblocked. More specifically, some of the outlet ports 118-128 can lead to different thrust jets of the pool cleaner 10 so that, when an outlet port 118-128 is unblocked, water can exit the pool cleaner 10 through its respective thrust jet 44, 52 and/or thrust jet port 46, 53. The thrust jets 44, 52 and/or thrust jet ports 46, 53 can be positioned along the pool cleaner 10 to direct water outward from the pool cleaner 10 in a specific direction, providing propulsion assistance. For example, the rear thrust jet 44 can be positioned along the pool cleaner 10 to direct pressurized water away from the rear of the pool cleaner 10 to assist in forward motion. The turn thrust jets 52 and the turn thrust jet ports 53 can be positioned on either side of the pool cleaner 10 to direct pressurized water away from the side of the pool cleaner 10 to assist in turning motion. The front thrust jet can be positioned along the pool cleaner 10 to direct pressurized water away from the front of the pool cleaner 10 to assist in backward motion.

In addition, one or more of the outlet ports 118-128 can lead to the hydraulic turbine assembly 40 of the pool cleaner 10, as further described below. Due to the sealing between the top cover 132 and the bottom cover 134, the sealing between each of the outlet ports 118-128 and the port elbows 142 and/or connectors 138, 140, and the minimal wear port seal liners 154 between the timer discs 148, 150 and the outlet ports 118-128, the timer disc assembly 114 can remain substantially leak proof. As a result, water exiting through the outlet ports 118-128 can remain at optimal pressure, providing improved propulsion assistance as well as improved driving force for the turbine assembly 40.

As described above, the pool cleaner 10 can include the first rear turn thrust jet 52, the second rear turn thrust jet 52, the rear thrust jet 44, and the front thrust jet (not shown). The pool cleaner 10 can also include the thrust jet ports 46, 53 in fluid communication with the rear thrust jets 52 and the front thrust jet, respectively. One of the outer port elbows 142 coupled to outlet ports 118 or 124 can be fluidly connected to the rear thrust jet 44 to assist forward propulsion of the pool cleaner 10 (i.e., the forward movement state). One of the inner port elbows 142 coupled to outlet port 120 or 122 can be fluidly connected to the first turn thrust jet 52 and the other one of the inner port elbows coupled to outlet port 122 or 120 can be fluidly connected to the second rear thrust jet 52. The slots 162 can be located on the timer disc 148 so that only one of outlet ports 120, 122 is unblocked at a time. As a result, when one of the outlet ports 120, 122 is unblocked, water will be routed to one of the turn thrust jets 52 to assist in turning the pool cleaner 10 (i.e., one of the turn movement states). The bottom port elbow 142 coupled to outlet port 126 can be fluidly connected to the front thrust jet to assist in backward propulsion of the pool cleaner 10 (i.e., the backward movement state). The timer discs 148, 150 can be positioned relative to each other so that when the bottom outlet port 126 is unblocked (e.g., allowing water to exit the pool cleaner 10 through the front thrust jet), all four of the top outlet ports 118-124 are blocked (e.g., blocking water from exiting the pool cleaner 10 via the rear thrust jet 44 or the turn thrust jets 52). In addition, the slots 162 can be located on the timer discs 148, 150 so that one of the outer outlet ports 118, 124 can substantially always be unblocked when one of the inner outlet ports 120, 122 is unblocked.

In some embodiments, the thrust jets 44, 52 can be stand-alone pieces coupled to the pool cleaner 10 or the thrust jets 44, 52 can be integral with the chassis 48 or cover assembly 12. In addition, the front thrust jet can be integral with the front grill 18 so that it in direct fluid communication with the front thrust jet port 46, and the turn thrust jet ports 53 can be aligned with the turn thrust jets 52. As a result, the front thrust jet and the turn thrust jets 52 may not extend outward from the cover assembly 12. Fluid connections between the port elbows 142 (and/or connectors 138, 140) and the thrust jets 44, 52 (and/or other inlets/outlets of the pool cleaner 10) can be accomplished via tubing or similar connections (not shown). In other embodiments, the front thrust jet and/or the turn thrust jets 52 can extend through the cover assembly so that the thrust jet ports 46, 53 are not necessary. Similarly, in other embodiments, the rear thrust jet 44 can remain enclosed within the cover assembly 12 and can align with a rear thrust jet port (not shown) along the cover assembly 12.

As discussed above, one or more of the outlet ports 118-128 can be fluidly connected to the hydraulic turbine assembly 40 via port elbows 142, connectors 140, etc. to provide water pressure for driving the hydraulic turbine assembly 40 in a forward direction and/or a backward direction. The hydraulic turbine assembly 40 can include a turbine wheel 172 and the turbine shaft 38. The turbine wheel 172 can be housed within a turbine housing 174, which can be completely or partially separate from, or integral with, the chassis 48 and/or cover assembly 12. The turbine shaft 38 can be pinion shaped or otherwise threaded and can engage the inner teeth 36 of the front wheel assemblies 28, as described above. Rotation of the turbine shaft 38 can thus cause the front wheel assemblies 28 to rotate and drive the pool cleaner 10. The turbine housing 174 can include one or more openings 176, 178 to allow a stream of incoming water through the turbine housing 174. This stream of incoming water can be directed toward the turbine wheel 172 to cause rotation of the turbine wheel 172, and thus causes rotation of the turbine shaft 38.

Figure 13:
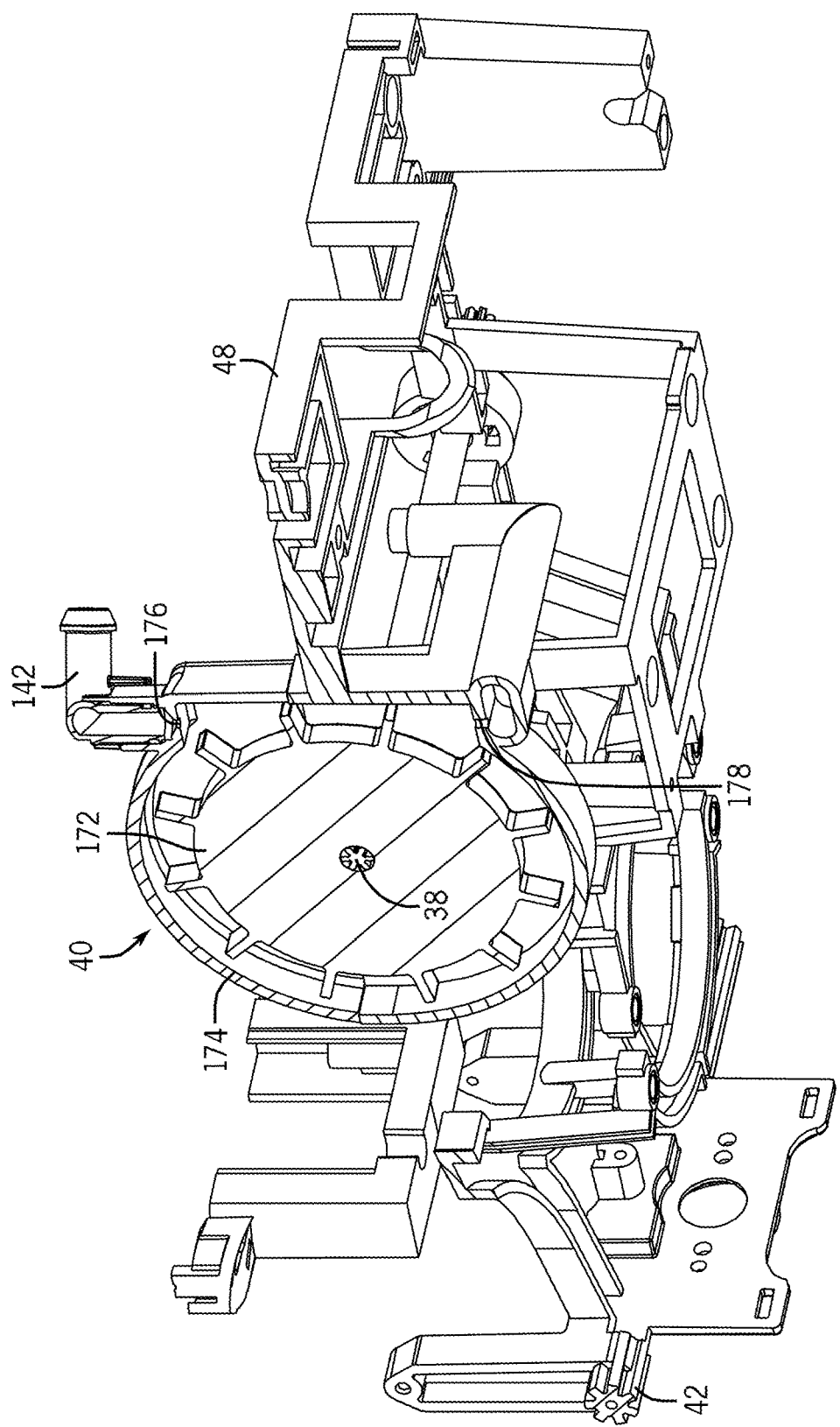
FIG. 13 is a perspective cross-sectional view of a turbine assembly of the pool cleaner of FIG. 1.

In one embodiment, as shown in FIG. 13, the turbine housing 174 can include a first opening 176 and a second opening 178. The first opening 176 can be fluidly connected to an upper outer port elbow 142 so that, when the respective outlet port 118 is unblocked, water can be directed into the turbine housing 174 to drive the pool cleaner 10 in a forward motion. The second opening 178 can be fluidly connected to the lower connector 140 so that, when the respective outlet port 128 is unblocked, water can be directed into the turbine housing 174 to drive the pool cleaner 10 in a backward direction. The timer discs 148, 150 can be positioned relative to each other so that only one of the openings 176, 178 may receive incoming water at a time. In some embodiments, water can leak out from a side of the turbine housing 174 after entering one of the openings 176, 178 to drive the turbine wheel 172.

Figure 14:
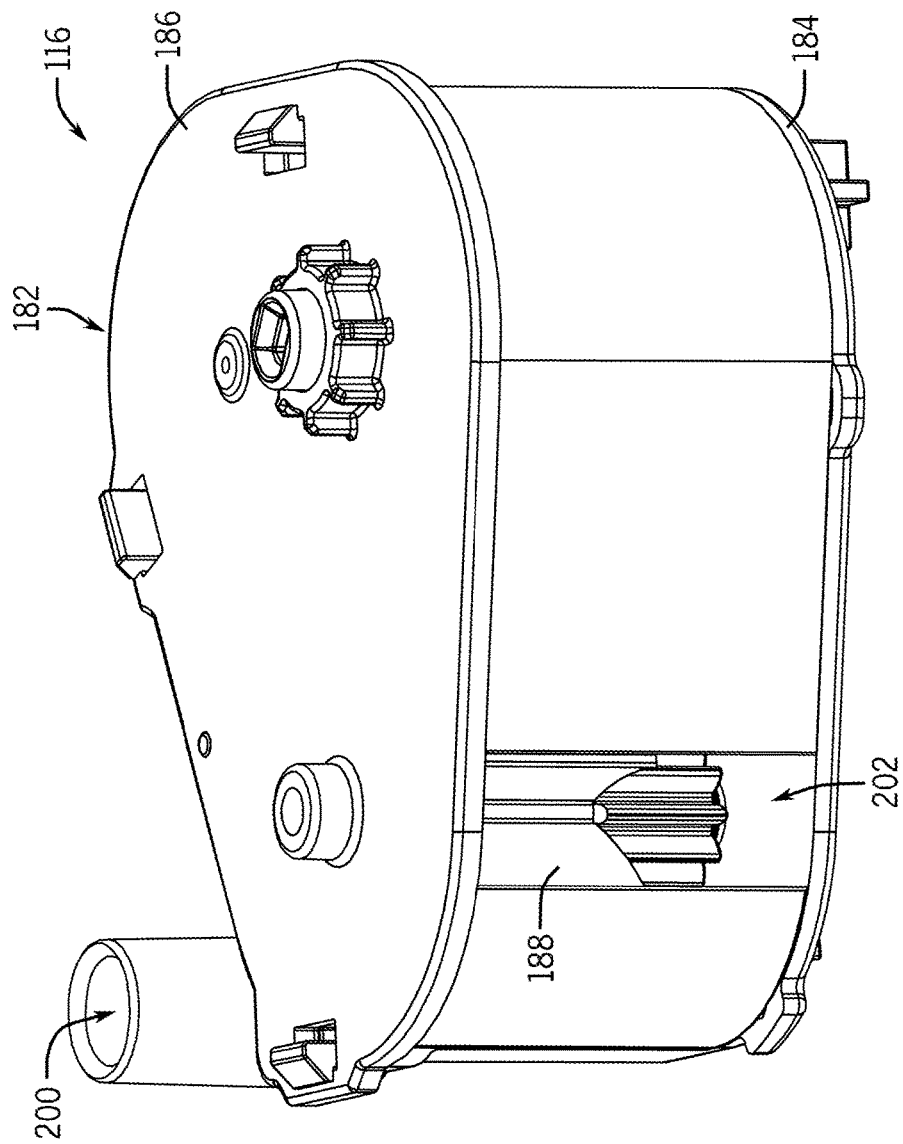
FIG. 14 is a perspective view of a timer valve gear box of the timer assembly of FIG. 10.
Figure 15:
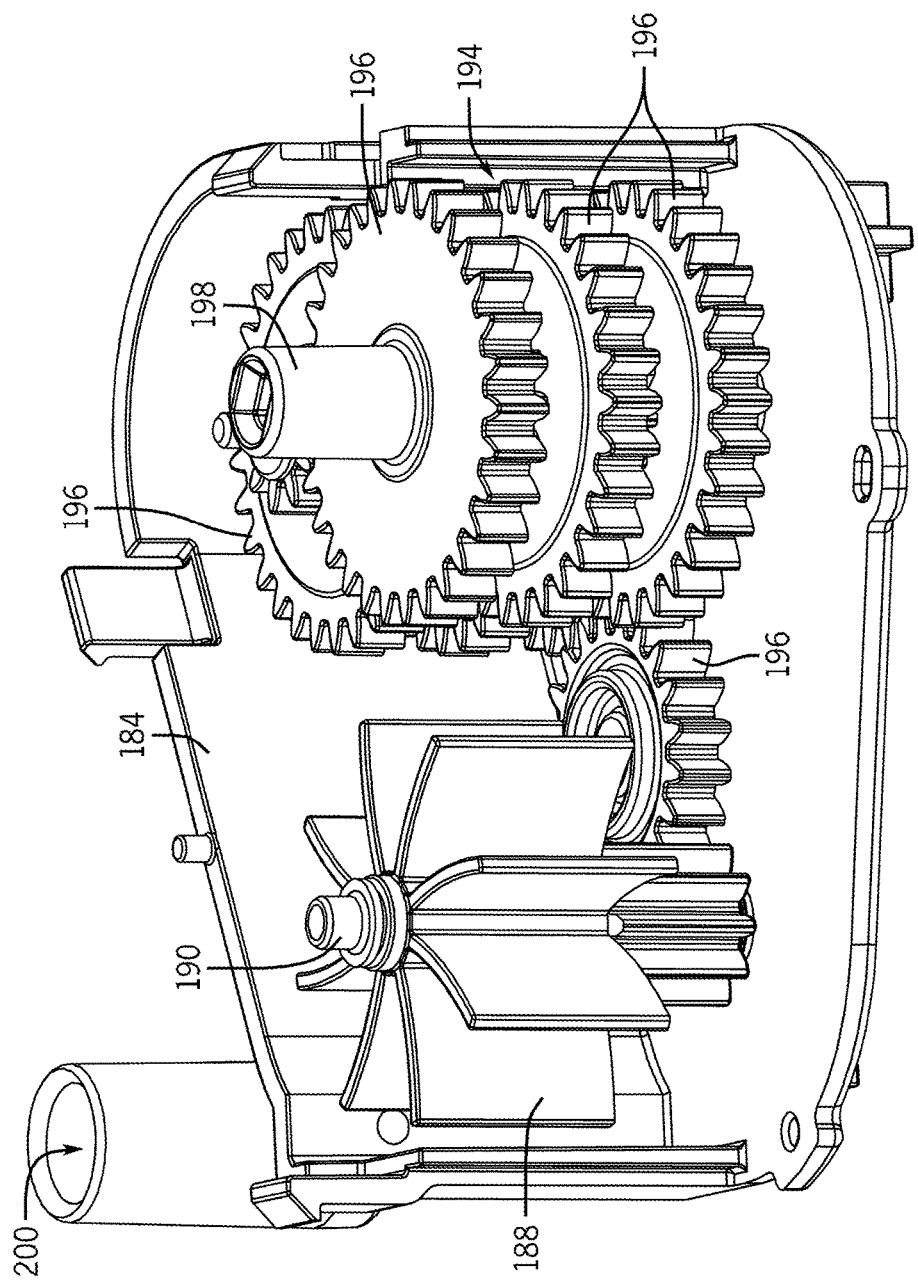
FIG. 15 is a partial perspective view of the timer valve gear box of FIG. 14.

In some embodiments, the timer valve gear box 116 can be used to drive the rotation of the timer discs 148, 150. As shown in FIGS. 14 and 15, the timer valve gear box 116 can include a gear box housing 182, such as a bottom plate 184 and a top cover 186 coupled together via a press-fit, fasteners (not shown), or other coupling methods, a paddle wheel 188, a paddle wheel shaft 190, paddle wheel bearings 192, and a gear train 194 including a plurality of gears 196 rotatable about one or more shafts 198. The gear box housing 182 can include an inlet 200 and an outlet 202 to allow a stream of water to flow through the timer valve gear box 116. The paddle wheel 188 can be positioned in line with the stream of water so that the water causes rotation of the paddle wheel 188. Rotation of the paddle wheel 188 can engage the gear train 194 to cause rotation of the gear train 194 (e.g., the paddle wheel 188 can act as the driving gear of the gear train 194). The number and positioning of the gears 196 can provide a desired gear ratio relative to the paddle wheel 188 to achieve a required speed and torque for running the timer discs 148, 150 at a desired rate. A final gear 196 of the gear train 194 can be coupled to the pinion shaft 158 of the timer disc assembly 114 via a final gear shaft 198 extending through the top cover 186. As a result, rotation of the final gear shaft 198 can cause rotation of the timer discs 148, 150. In one embodiment, a desired rotation rate of the final gear 196 can be about 0.9 revolutions per minute. Rotation rate can vary depending on the original rotation rate of the paddle wheel 188, which is based on the incoming stream of water. As a result, changes in pool pump or booster pump output pressure can sometimes affect the rotation rate of the timer discs 148, 150.

The timer valve gear box 116 and the timer disc assembly 114 can achieve desired cycles of forward, backward and turning movement states. The timer valve gear box 116 (e.g., the gear ratios) can be designed to achieve an optimal cycle time needed for efficient cleaning. For example, a full cycle can be considered the following: right turn, backward movement, right turn, forward movement, left turn, backward movement, left turn, forward movement. The time in each movement state can depend on the rotation of the timer discs 148, 150 as well as the size of the slots 162 (i.e., the amount of time each outlet port 118-128 is blocked or unblocked). This precise timing and movement cycle can allow the pool cleaner 10 to efficiently clean the pool in a substantially random motion, improving pool coverage and cleaning time. In addition, the timer valve gear box 116 and the timer disc assembly 114 can be independent from the venturi vacuum assembly 62. As a result, the pool cleaner 10 can constantly vacuum debris during all movement states, in comparison to conventional pool cleaners that require a non-vacuuming period for backward and/or turning movement.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A pool cleaner, comprising:
   a chassis;
   a cover assembly supported by the chassis;
   at least one drive wheel supported by the chassis;
   a turbine assembly which rotates in one of a first direction and a second direction to drive the at least one drive wheel; and
   a timer disc assembly including at least one rotating timer disc that controls
      a flow of pressurized fluid away from the cover assembly in a forward direction for backward propulsion assistance of the pool cleaner during a first time period, a rearward direction for forward propulsion assistance of the pool cleaner during a second time period, and a sideways direction for turning propulsion assistance of the pool cleaner during at least a portion of one of the first time period and the second time period, and
      a flow of pressurized fluid to the turbine assembly through a first opening for driving the turbine assembly in the first direction during the first time period and a second opening for driving the turbine assembly in the second direction during the second time period.

2. The pool cleaner of claim 1 further comprising a timer valve gear box which controls a duration of the first time period and the second time period.

3. The pool cleaner of claim 2, wherein the timer valve gear box is coupled to the timer disc assembly and controls a desired rotation rate of the at least one rotating timer disc.

4. The pool cleaner of claim 3, wherein the timer valve gear box includes a hydraulically driven paddle wheel engaged with a gear train, the gear train drives a pinion gear engaging with the at least one rotating timer disc at the desired rotation rate.

5. The pool cleaner of claim 1, wherein the at least one drive wheel includes a first drive wheel positioned along one side of the cover assembly and a second drive wheel positioned along an opposite side of the cover assembly.

6. The pool cleaner of claim 1, wherein the timer disc assembly includes a plurality of outlets, wherein the at least one rotating timer disc controls the flow of pressurized fluid away from the cover assembly and the flow of pressurized fluid to the turbine assembly by periodically blocking and unblocking the plurality of outlets.

7. The pool cleaner of claim 1, wherein the timer disc assembly includes:
   a first outlet port in fluid communication with a first thrust jet configured to direct the flow of pressurized fluid away from the cover assembly in the forward direction;
   a second outlet port in fluid communication with a second thrust jet configured to direct the flow of pressurized fluid away from the cover assembly in the rearward direction; and
   a third outlet port in fluid communication with a third thrust jet configured to direct the flow of pressurized fluid away from the cover assembly in the sideways direction.

8. The pool cleaner of claim 1, wherein the timer disc assembly includes a first outlet port and a second outlet port, the flow of pressurized fluid is directed to the first opening via the first outlet port, and the flow of pressurized fluid is directed to the second opening via the second outlet port.

9. The pool cleaner of claim 1, wherein the turbine assembly is rotated in the first direction via the flow of pressurized fluid through the first opening and rotated in the second direction via the flow of pressurized fluid through the the second opening.

10. The pool cleaner of claim 9, wherein rotation of the turbine assembly in one of the first direction and the second direction causes the at least one drive wheel to rotate.

11. The pool cleaner of claim 10, wherein the turbine assembly includes a turbine shaft configured to engage the at least one drive wheel.

12. The pool cleaner of claim 11, wherein rotation of the turbine assembly in the first direction causes the at least one drive wheel to rotate in a first direction and rotation of the turbine assembly in the second direction causes the at least one drive wheel to rotate in a second direction.

13. A pool cleaner, comprising:
a chassis;
a cover assembly and at least one drive wheel supported by the chassis;
a turbine assembly in communication with the at least one drive wheel; and
a timer disc assembly including at least one rotating timer disc that controls a flow of pressurized fluid to the turbine assembly by rotating to a first position to cause alignment with a first outlet port for driving the turbine assembly in a first direction during a first time period, and rotating to a second position to cause alignment with a second outlet port for driving the turbine assembly in a second direction during a second time period.

14. The pool cleaner of claim 13, wherein the first outlet port is in fluid communication with a first thrust jet and the second outlet port is in fluid communication with a second thrust jet.

15. The pool cleaner of claim 13, wherein the pressurized fluid is directed to the turbine assembly via a third outlet port.

16. The pool cleaner of claim 15, wherein the turbine assembly is rotated via the pressurized fluid.

17. The pool cleaner of claim 16, wherein rotation of the turbine assembly causes the at least one drive wheel to rotate.

18. The pool cleaner of claim 13, wherein the at least one rotating timer disc blocks the flow of pressurized fluid through the second outlet port when in the first position, and blocks the flow of pressurized fluid through the first outlet port when in the second position.

19. A pool cleaner, comprising:
a chassis;
a cover assembly supported by the chassis;
at least one drive wheel supported by the chassis;
a turbine assembly which rotates in one of a first direction and a second direction to drive the at least one drive wheel;
a timer disc assembly including at least one rotating timer disc that controls
a flow of pressurized fluid away from the cover assembly in a forward direction for backward propulsion assistance of the pool cleaner during a first time period, a rearward direction for forward propulsion assistance of the pool cleaner during a second time period, and a sideways direction for turning propulsion assistance of the pool cleaner during at least a portion of one of the first time period and the second time period, and
a flow of pressurized fluid to the turbine assembly through a first opening for driving the turbine assembly in the first direction during the first time period and a second opening for driving the turbine assembly in the second direction during the second time period; and
a timer valve gear box that controls a duration of the first time period and the second time period, the timer valve gear box being coupled to the timer disc assembly and controlling a desired rotation rate of the at least one rotating timer disc, the timer valve gear box including a hydraulically driven paddle wheel engaged with a gear train, the gear train driving a pinion gear engaging with the at least one rotating timer disc at the desired rotation rate.

20. The pool cleaner of claim 19, wherein the timer disc assembly includes a plurality of outlets, wherein the at least one rotating timer disc controls the flow of pressurized fluid away from the cover assembly and the flow of pressurized fluid to the turbine assembly by periodically blocking and unblocking the plurality of outlets.

* * * * *